US011858503B2

(12) United States Patent
Haque et al.

(10) Patent No.: US 11,858,503 B2
(45) Date of Patent: Jan. 2, 2024

(54) ROAD SEGMENT SIMILARITY DETERMINATION

(71) Applicant: Lyft, Inc., San Francisco, CA (US)

(72) Inventors: Asif Haque, Menlo Park, CA (US); Mark Douglas Huyler, Redmond, WA (US); Gerard Joyce, Los Altos, CA (US); Ying Liu, Los Altos, CA (US); David Tse-Zhou Lu, Menlo Park, CA (US); Sameer Qureshi, Sunnyvale, CA (US); Vinay Shet, Fremont, CA (US)

(73) Assignee: Lyft, Inc., San Francisco, CA (US)

( * ) Notice: Subject to any disclaimer, the term of this patent is extended or adjusted under 35 U.S.C. 154(b) by 220 days.

(21) Appl. No.: 17/374,654

(22) Filed: Jul. 13, 2021

(65) Prior Publication Data
US 2022/0001863 A1  Jan. 6, 2022

Related U.S. Application Data

(63) Continuation of application No. 16/681,683, filed on Nov. 12, 2019, now Pat. No. 11,091,156, which is a
(Continued)

(51) Int. Cl.
*B60W 30/095* (2012.01)
*B60W 30/09* (2012.01)
(Continued)

(52) U.S. Cl.
CPC ......... *B60W 30/095* (2013.01); *B60W 30/09* (2013.01); *B60W 40/06* (2013.01);
(Continued)

(58) Field of Classification Search
CPC .... B60W 30/095; B60W 30/09; B60W 40/06; B60W 10/04; B60W 10/18; B60W 10/20;
(Continued)

(56) References Cited

U.S. PATENT DOCUMENTS 7,680,749 B1   3/2010  Golding et al.
8,489,316 B1   7/2013  Hedges
(Continued)

FOREIGN PATENT DOCUMENTS

EP    3342683       7/2018
JP    2010134499 A  6/2010

OTHER PUBLICATIONS

International Patent Application No. PCT/USZ019/045780, Search Report and Written Opinion dated Nov. 27, 2019, 10 pages.
(Continued)

*Primary Examiner* — Jason Holloway
(74) *Attorney, Agent, or Firm* — Sheppard Mullin Richter and Hampton LLP

(57) ABSTRACT

Systems, methods, and non-transitory computer-readable media can determine a road segment. A set of features associated with the road segment can be determined based at least in part on data captured by one or more sensors of a vehicle. A level of similarity between the road segment and each of a set of road segment types can be determined by comparing the set of features to features associated with each of the set of road segment types. The road segment can be classified as a road segment type based on the level of similarity. Scenario information associated with the road segment can be determined based on the classified road segment type.

20 Claims, 16 Drawing Sheets

Related U.S. Application Data continuation of application No. 16/104,842, filed on Aug. 17, 2018, now Pat. No. 10,479,356.

(51) Int. Cl.
*B60W 40/06* (2012.01)
*B60W 10/04* (2006.01)
*B60W 10/18* (2012.01)
*G01S 17/93* (2020.01)
*G05D 1/02* (2020.01)
*B60W 10/20* (2006.01)

(52) U.S. Cl.
CPC ............ *B60W 10/04* (2013.01); *B60W 10/18* (2013.01); *B60W 10/20* (2013.01); *B60W 2420/42* (2013.01); *B60W 2420/52* (2013.01); *G01S 17/93* (2013.01); *G05D 1/0238* (2013.01); *G05D 1/0246* (2013.01); *G05D 1/0278* (2013.01)

(58) Field of Classification Search
CPC ......... B60W 2420/42; B60W 2420/52; B60W 30/14; B60W 2420/40; B60W 2420/54; G01S 17/93; G05D 1/0238; G05D 1/0246; G05D 1/0278; G01C 21/28; B60Y 2300/14; B60Y 2400/30
See application file for complete search history.

(56) References Cited

U.S. PATENT DOCUMENTS

| | | |
|---|---|---|
| 9,672,734 B1 | 6/2017 | Ratnasingam |
| 9,881,503 B1 | 1/2018 | Goldman-Shenhar |
| 10,186,156 B2 | 1/2019 | Sweeney |
| 10,338,594 B2 | 7/2019 | Long |
| 10,372,132 B2 | 8/2019 | Herz et al. |
| 10,414,395 B1 | 9/2019 | Sapp et al. |
| 10,992,755 B1 | 4/2021 | Tran |
| 11,126,180 B1 | 9/2021 | Kobilarov |
| 11,150,660 B1 | 10/2021 | Kabirzadeh et al. |
| 11,200,429 B1 | 12/2021 | Evans et al. |
| 11,409,304 B1 | 8/2022 | Cai et al. |
| 2003/0131069 A1 | 7/2003 | Lucovsky et al. |
| 2003/0131142 A1 | 7/2003 | Horvitz et al. |
| 2004/0210500 A1 | 10/2004 | Sobel et al. |
| 2005/0044108 A1 | 2/2005 | Shah et al. |
| 2005/0049993 A1 | 3/2005 | Nori et al. |
| 2005/0137769 A1 | 6/2005 | Takamatsu et al. |
| 2006/0036642 A1 | 2/2006 | Horvitz et al. |
| 2008/0071465 A1 | 3/2008 | Chapman et al. |
| 2008/0162498 A1 | 7/2008 | Omoigui |
| 2009/0177685 A1 | 7/2009 | Ellis et al. |
| 2009/0240728 A1 | 9/2009 | Shukla et al. |
| 2010/0017060 A1 | 1/2010 | Zhang |
| 2011/0251735 A1 | 10/2011 | Hayashi |
| 2012/0078595 A1 | 3/2012 | Balandin et al. |
| 2012/0078905 A1 | 3/2012 | Lin et al. |
| 2012/0191716 A1 | 7/2012 | Omoigui |
| 2012/0209505 A1 | 8/2012 | Breed et al. |
| 2012/0259732 A1 | 10/2012 | Sasankan et al. |
| 2012/0330540 A1 | 12/2012 | Ozaki et al. |
| 2013/0166205 A1 | 6/2013 | Ikeda et al. |
| 2013/0278442 A1 | 10/2013 | Rubin et al. |
| 2014/0032581 A1 | 1/2014 | Young |
| 2014/0257659 A1 | 9/2014 | Dariush |
| 2015/0269198 A1 | 9/2015 | Cornish et al. |
| 2015/0291146 A1 | 10/2015 | Prakah-Asante et al. |
| 2016/0061625 A1 | 3/2016 | Wang |
| 2016/0171521 A1 | 6/2016 | Ramirez |
| 2016/0223343 A1 | 8/2016 | Averbuch |
| 2016/0275730 A1 | 9/2016 | Bonhomme |
| 2016/0334797 A1 | 11/2016 | Ross |
| 2016/0357788 A1 | 12/2016 | Wilkes et al. |
| 2017/0010107 A1 | 1/2017 | Shashua |
| 2017/0017529 A1 | 1/2017 | Elvanoglu et al. |
| 2017/0089710 A1 | 3/2017 | Slusar |
| 2017/0113685 A1 | 4/2017 | Sendhoff |
| 2017/0132334 A1 | 5/2017 | Levinson et al. |
| 2017/0177937 A1 | 6/2017 | Harmsen |
| 2017/0200063 A1 | 7/2017 | Nariyambut Murali et al. |
| 2017/0241791 A1 | 8/2017 | Madigan |
| 2017/0270372 A1* | 9/2017 | Stein ......................... G06T 7/60 |
| 2017/0286782 A1 | 10/2017 | Pillai et al. |
| 2017/0293763 A1 | 10/2017 | Shear et al. |
| 2018/0005254 A1 | 1/2018 | Bai et al. |
| 2018/0023964 A1 | 1/2018 | Ivanov et al. |
| 2018/0136979 A1 | 5/2018 | Morris |
| 2018/0137373 A1 | 5/2018 | Rasmusson, Jr. |
| 2018/0149491 A1 | 5/2018 | Tayama |
| 2018/0181095 A1 | 6/2018 | Funk et al. |
| 2018/0217600 A1 | 8/2018 | Shashua et al. |
| 2018/0246752 A1 | 8/2018 | Bonetta et al. |
| 2018/0288060 A1 | 10/2018 | Jackson et al. |
| 2018/0316695 A1 | 11/2018 | Esman |
| 2019/0019329 A1 | 1/2019 | Eyler et al. |
| 2019/0042867 A1 | 2/2019 | Chen et al. |
| 2019/0049948 A1 | 2/2019 | Patel et al. |
| 2019/0049968 A1 | 2/2019 | Dean |
| 2019/0108753 A1 | 4/2019 | Kaiser et al. |
| 2019/0143992 A1 | 5/2019 | Sohn et al. |
| 2019/0171797 A1 | 6/2019 | Morris |
| 2019/0174397 A1 | 6/2019 | Naqvi |
| 2019/0205310 A1 | 7/2019 | Satkunarajah et al. |
| 2019/0243371 A1 | 8/2019 | Nister |
| 2019/0244040 A1 | 8/2019 | Hermann |
| 2019/0256087 A1 | 8/2019 | Kim et al. |
| 2019/0258251 A1 | 8/2019 | Ditty |
| 2019/0258878 A1 | 8/2019 | Koivisto |
| 2019/0266139 A1 | 8/2019 | Kumarasamy et al. |
| 2019/0370615 A1 | 12/2019 | Murphy et al. |
| 2019/0377354 A1 | 12/2019 | Shalev-Shwartz et al. |
| 2020/0013088 A1 | 1/2020 | Naqvi |
| 2020/0019161 A1 | 1/2020 | Stenneth |
| 2020/0042626 A1 | 2/2020 | Curtis et al. |
| 2020/0042651 A1 | 2/2020 | Curtis et al. |
| 2020/0050190 A1 | 2/2020 | Patel et al. |
| 2020/0050483 A1 | 2/2020 | Shear et al. |
| 2020/0081445 A1 | 3/2020 | Stetson et al. |
| 2020/0117200 A1 | 4/2020 | Akella et al. |
| 2020/0151353 A1 | 5/2020 | Struttmann |
| 2020/0180610 A1 | 6/2020 | Schneider et al. |
| 2020/0183794 A1 | 6/2020 | Dwarampudi et al. |
| 2020/0201890 A1 | 6/2020 | Viswanathan |
| 2020/0204534 A1 | 6/2020 | Beecham et al. |
| 2020/0285788 A1 | 9/2020 | Brebner |
| 2020/0351322 A1 | 11/2020 | Magzimof et al. |
| 2020/0394455 A1 | 12/2020 | Lee et al. |
| 2021/0011150 A1 | 1/2021 | Bialer et al. |
| 2021/0021539 A1 | 1/2021 | Shear et al. |
| 2021/0041873 A1 | 2/2021 | Kim et al. |
| 2021/0053561 A1 | 2/2021 | Beller et al. |
| 2021/0055732 A1 | 2/2021 | Caldwell et al. |
| 2021/0097148 A1 | 4/2021 | Bagschik et al. |
| 2021/0142526 A1 | 5/2021 | Mantyjarvi et al. |
| 2021/0350147 A1 | 11/2021 | Yuan et al. |
| 2022/0011130 A1 | 1/2022 | Hanniel et al. |
| 2022/0113371 A1 | 4/2022 | Han et al. |
| 2022/0163348 A1 | 5/2022 | Zhang et al. |

OTHER PUBLICATIONS

International Patent Application No. PCT/US2020/039444, Search Report and Written Opinion dated Oct. 13, 2020, 10 pages.

* cited by examiner

ROAD SEGMENT SIMILARITY DETERMINATION

CROSS-REFERENCE TO RELATED APPLICATIONS

This application is a continuation of U.S. patent application Ser. No. 16/681,683, filed on Nov. 12, 2019 and entitled "ROAD SEGMENT SIMILARITY DETERMINATION", which is a continuation of U.S. patent application Ser. No. 16/104,842, filed on Aug. 17, 2018 and entitled "ROAD SEGMENT SIMILARITY DETERMINATION", all of which are incorporated in their entireties herein by reference.

FIELD OF THE INVENTION

The present technology relates to the field of autonomous vehicles. More particularly, the present technology relates to systems, apparatus, and methods for determining similarities between road segments.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, an autonomous vehicle may have optical cameras for recognizing hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to determine a road segment. A set of features associated with the road segment can be determined based at least in part on data captured by one or more sensors of a vehicle. A level of similarity between the road segment and each of a set of road segment types can be determined by comparing the set of features to features associated with each of the set of road segment types. The road segment can be classified as a road segment type based on the level of similarity. Scenario information associated with the road segment can be determined based on the classified road segment type.

In an embodiment, the systems, methods, and non-transitory computer readable media are configured to receive a set of features data corresponding to the road segment based at least in part on the data captured by one or more sensors, determine at least one scenario that is associated with the set of features, log the at least one scenario associated with the road segment and the road segment type in a scenario information database, and determine the scenario information associated with the road segment type in the scenario information database.

In an embodiment, the set of features corresponding to the road segment identify one or more of: at least one object, at least one road feature, and at least one contextual feature.

In an embodiment, the determination of the level of similarity between the road segment and each of the set of road segment types comprises determining that at least a threshold number of features in the set of features associated with the road segment and features in a set of features associated with a road segment type match.

In an embodiment, the determination of scenario information associated with the road segment based on the road segment type comprises determining a risk profile associated with the road segment type, wherein the risk profile is based on scenarios and corresponding scenario exposure rates for the road segment type.

In an embodiment, the systems, methods, and non-transitory computer readable media are configured to associate the risk profile associated with the road segment type with the road segment.

In an embodiment, the systems, methods, and non-transitory computer readable media are configured to store information describing the association between the road segment and the risk profile in a scenario information database.

In an embodiment, the systems, methods, and non-transitory computer readable media are configured to associate instructions for modifying an operation of an autonomous vehicle with the road segment.

In an embodiment, the systems, methods, and non-transitory computer readable media are configured to generate a value of aggregate risk for a fleet based in part on classifying the road segment as the road segment type.

In an embodiment, the systems, methods, and non-transitory computer readable media are configured to determine an aggregate scenario exposure for a first geographic location, determine a threshold level of similarity between the first geographic location and a second geographic location based on a comparison of respective road segments of the first geographic location and the second geographic location, and associate the aggregate scenario exposure with the second geographic location.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

Figure 1A:
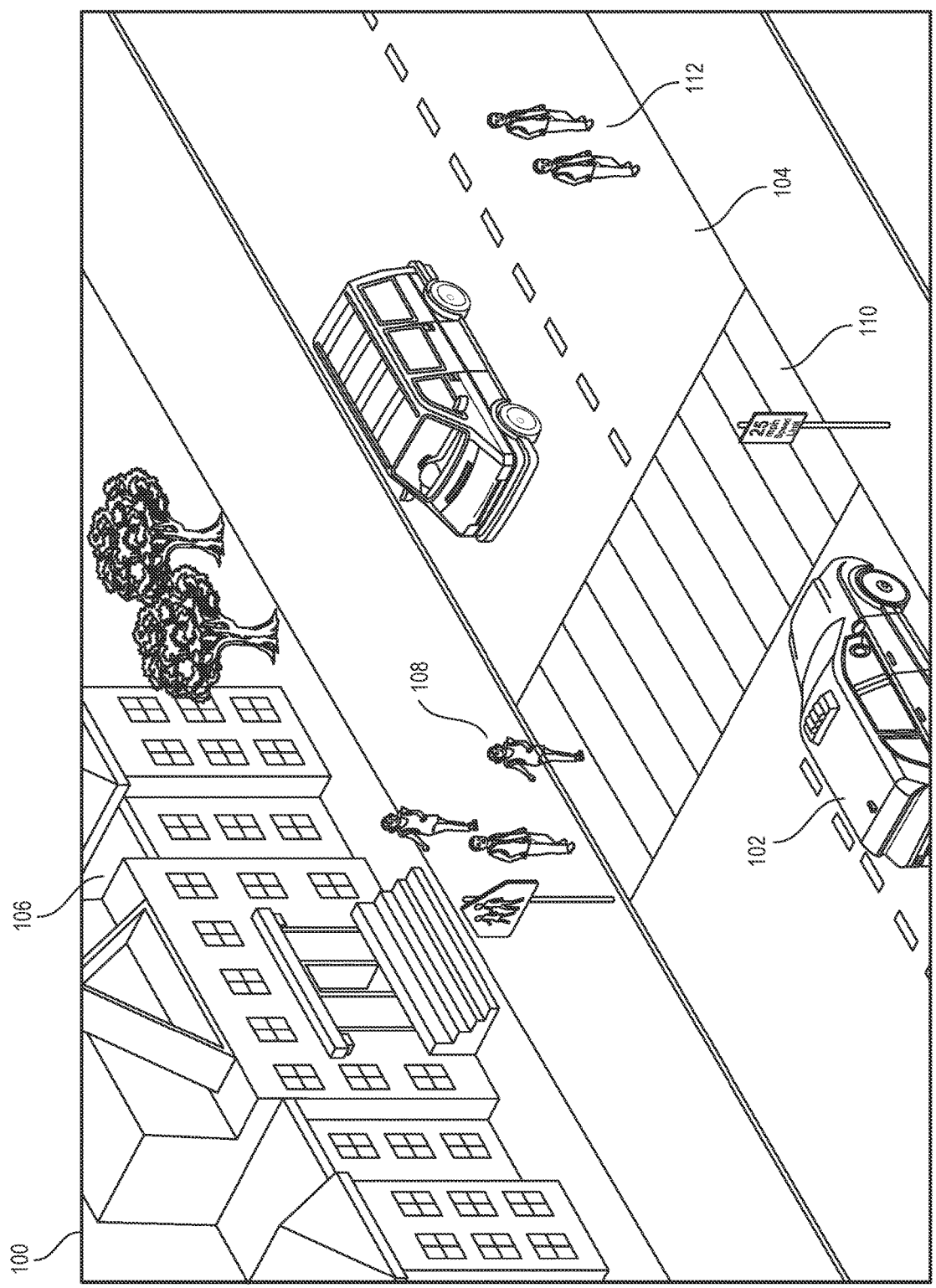
FIGS. 1A-1C illustrate various scenarios that may be experienced and determined by a vehicle, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, an autonomous vehicle may have optical cameras for recognizing hazards, roads, lane markings, traffic signals, and the like. Data from sensors may be used to, for example, safely drive the vehicle, activate certain safety features (e.g., automatic braking), and generate alerts about potential hazards.

Autonomous, semi-autonomous, or manually-driven vehicles may be used by a transportation management system to provide ride services or other types of services. A transportation management system may comprise a fleet of such vehicles. Each vehicle in the fleet may include one or more sensors in a sensor suite. In general, a vehicle can traverse a geographic location or region using a number of different routes. Each route can be made up of one or more road segments. When traveling on a given road segment, a computing system in a vehicle can continually process data from one or more sensors in the vehicle, for example, to identify potential hazards such as fallen debris, jaywalkers, slick road surface, and the like. The computing system can also control various operations of the vehicle, such as driving and navigating, in view of the potential hazards. Under conventional approaches, a vehicle typically detects potential hazards associated with a given road segment as the vehicle navigates the road segment. Under such conventional approaches, the vehicle is typically unaware of risks associated with the potential hazards before navigating the road segment. Delayed awareness of the risks associated with the potential hazards can negatively impact safety considerations in relation to the vehicle and surrounding environment. Conventional approaches pose disadvantages in addressing these and other problems.

An improved approach in accordance with the present technology overcomes the foregoing and other disadvantages associated with conventional approaches. The improved approach may include multiple, different phases including a first phase for building a scenario information database including (i) real world sensor data and features corresponding to road segments in geographic areas comprising a variety of different road segment types, (ii) scenario classification and identification information based on collected real world sensor data for the variety of different road segment types, and (iii) risk profiles associated with the different classified scenarios and scenario types. A second phase may include determining respective similarities between classified (or highly sampled) road segments and unclassified (or less frequently sampled) road segments to infer scenario information (e.g., scenarios, scenario exposure rates) for road segments without requiring high frequency sampling of such road segments. Finally, risk profiles associated with different scenario exposure rates, as applied to different classified road segments, may be used to navigate vehicles in a region, determine capable or eligible autonomous vehicles for a route or region, determine a deployment strategy for different regions, cities, and neighborhoods based on the relevant risk profiles, and any other relevant use cases where risk and scenario exposure rates may be used for fleet management of autonomous, semi-autonomous, and human-driven vehicles.

In some embodiments, a similarity between a first road segment and a second road segment can be determined. For example, the first road segment may be a classified road segment associated with a risk profile that is based on scenario exposure rates. In this example, the second road segment may be an unclassified road segment that is not yet associated with a risk profile. In some embodiments, upon determining a threshold level of similarity between the first road segment and the second road segment, information associated with the first road segment can be used to infer information about the second road segment. For example, the risk profile, which can be based on scenario exposure rates for the first road segment, can be associated with the second road segment upon determining a threshold similarity between the first road segment and the second road segment. In some embodiments, a similarity between the first road segment and the second road segment may be determined based in part on respective sensor data collected by vehicles while sampling the first road segment and the second road segment, respective map data describing the first road segment and the second road segment, respective metadata associated with the first road segment and the second road segment, or a combination thereof.

In other embodiments, road segments can be categorized (or classified) into road segment types. For example, in some embodiments, a road segment can be categorized as a road segment type based on scenario exposures associated with the road segment. For example, a road segment can be categorized as a particular road segment type based on a threshold level of similarity between scenarios that are determined to be associated with the road segment and scenario types associated with the road segment type. In some embodiments, each road segment type can be associated with a risk profile that is based on respective likelihoods (or probabilities) of various scenario types that may be encountered when navigating a road segment categorized as the road segment type. Such risk profiles can be used for myriad purposes. For example, an autonomous, semi-autonomous, or manually-driven vehicle may be instructed to avoid road segments on which the vehicle has a threshold likelihood of being exposed to a given scenario type. For instance, a vehicle may be instructed to avoid using a road segment on which the vehicle has a threshold likelihood of encountering bicycle traffic. In another example, a vehicle may be instructed to modify its operation when traveling on a road segment on which the vehicle has a threshold likelihood of being exposed to a given scenario type. For instance, a vehicle may be instructed to reduce its speed and activate its hazard lights when traveling on a road segment on which the vehicle has a threshold likelihood of encountering poor visibility conditions. In some embodiments, risk profiles associated with individual road segments within a given geographic location (or region) (e.g., a city, county, zip code, state, country, or some other defined geographic region) can be used to generate a value of an aggregate risk for a fleet of autonomous (or semi-autonomous) vehicles operating in that geographic region. While examples of the present technology are sometimes discussed herein in relation to an autonomous vehicle, the present technology also applies to semi-autonomous and manually driven vehicles. More details relating to the present technology are provided below.

Figure 1B:
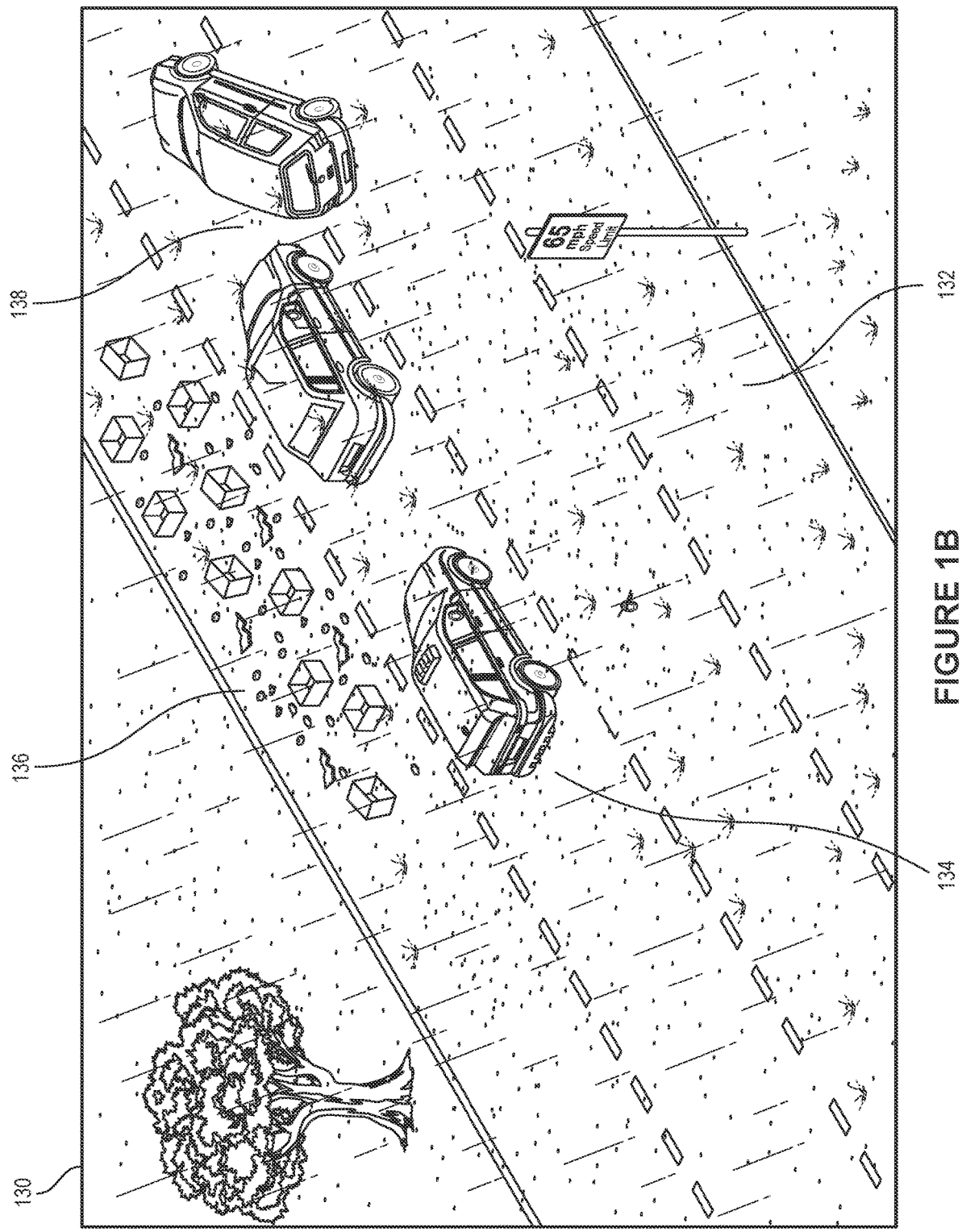
Figure 1C:
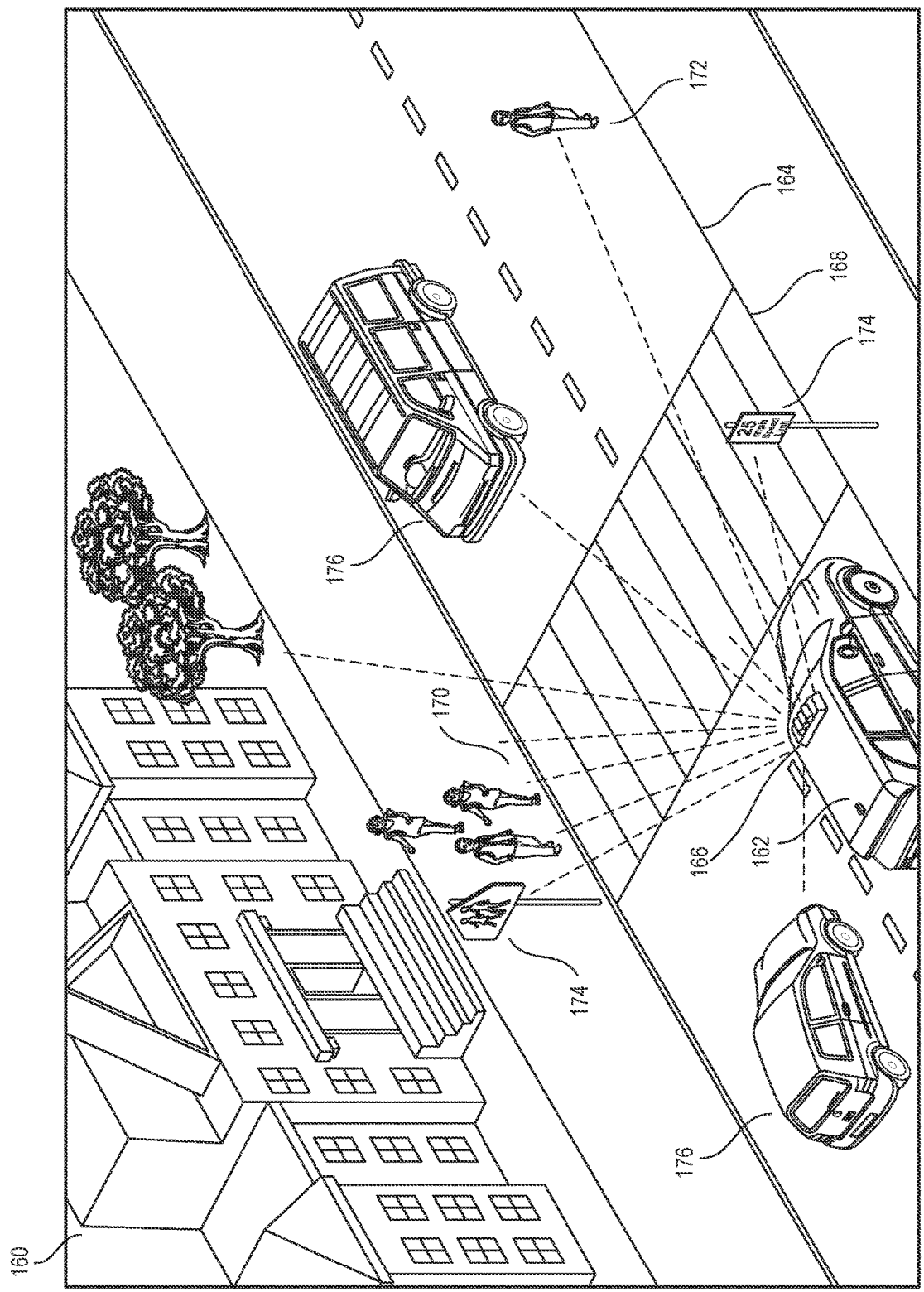

FIGS. 1A-1C illustrate various scenarios that may be experienced and determined by a vehicle. A vehicle may experience a variety of scenarios as it navigates a given geographic location (or region). In general, different geographic locations may present different challenges and risks for a vehicle. For example, FIG. 1A illustrates one example environment 100 that corresponds to a school zone. In this example, a vehicle 102 is shown navigating a road segment 104 along which a school 106 is located. When navigating such environments, the vehicle 102 may encounter a number of different scenarios such as children 108 walking through a crosswalk 110 and pedestrians 112 crossing the road segment 104. Other environments may pose different challenges and risks. For example, FIG. 1B illustrates another example environment 130 which includes a highway 132. In this example, a vehicle 134 is shown traveling on the highway 132 under inclement weather conditions. When navigating such environments, the vehicle 134 may encounter a number of different scenarios such as debris 136 blocking a lane of the highway 132 and other hazardous activity 138 (e.g., collisions) involving other vehicles traveling on the highway 132. Accordingly, different road segments may be associated with different risks. In general, a road segment can include any portion of a physical road network, for example, as characterized or represented by a geographic map. The map may have different levels (or layers) of detail (e.g., different road segments for different lanes of a road, all lanes of the road considered part of the same road segment, etc.). The map may include embedded information (e.g., a segmentation map) having applications for autonomously, semi-autonomously, or manually driven vehicles. In an embodiment, lengths of road segments may be uniform (e.g., all road segments have a uniform length such as 100 yards). In an embodiment, lengths of road segments may be non-uniform. For example, road segments can have different lengths based on their road segment type. That is, for example, suburban roads may have road segments every 100 yards while highways have road segments every quarter mile.

Figure 9:
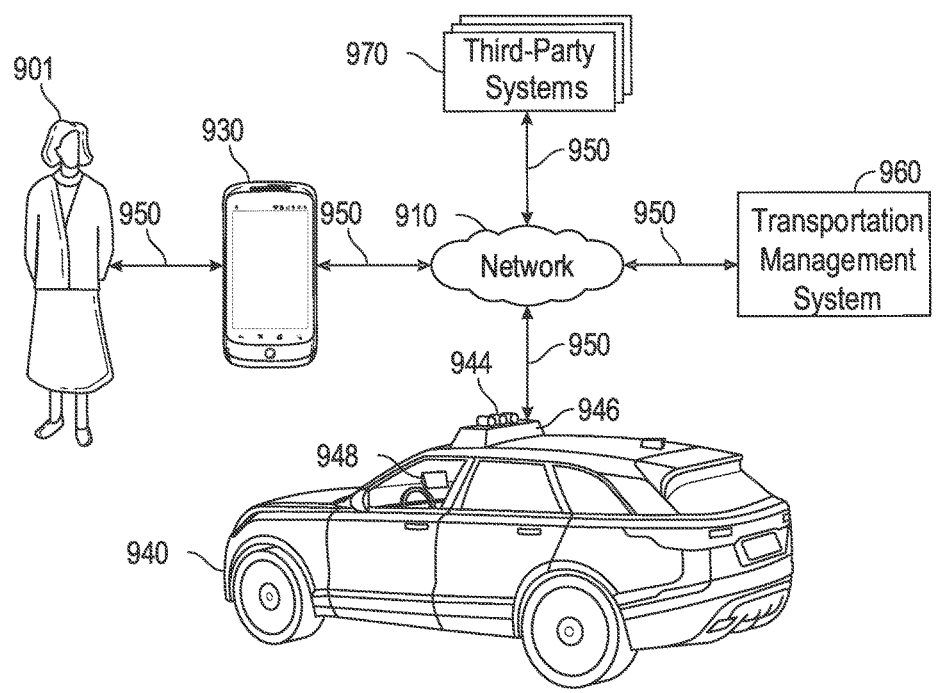
FIG. 9 illustrates an example block diagram of a transportation management environment, according to an embodiment of the present technology.

In general, a vehicle may be equipped with one or more sensors which can be used to capture environmental information, such as information describing a given road segment. For example, in some instances, a vehicle may be equipped with one or more sensors in a sensor suite including optical cameras, LiDAR, radar, infrared cameras, and ultrasound equipment, to name some examples. These sensors can be used to collect information that can be used by the vehicle to understand environmental conditions of a given road segment to permit safe and effective navigation of the road segment. For example, FIG. 1C illustrates an example environment 160 in which a vehicle 162 is navigating a road segment 164. The vehicle 162 can be, for example, a vehicle 940 as shown in FIG. 9. In FIG. 1C, the vehicle 162 includes a sensor suite 166 that can be used to sense static (or stationary) objects, dynamic objects, and semi-permanent (or ephemeral) objects that are around (or within some threshold proximity of) the vehicle 162. In this example, information collected by sensors included in the sensor suite 166 can be used to determine information about the road segment 164. For instance, sensors in the sensor suite 166 can be used to recognize a crosswalk 168, children 170 waiting to use the crosswalk 168, a pedestrian 172 jaywalking across the road segment 164, street signs 174, other vehicles 176 present on the road segment 164, and any other objects that are present. In addition to identifying objects, the sensors in the sensor suite 166 can also be used to monitor the identified objects. For example, once an object is identified, the sensors can be used to trace (or track) a path (or trajectory) of the object over time. Information collected by the sensors in the sensor suite 166 can be used to determine other descriptive features for the road segment 164. For example, such information can be used to determine road features describing the road segment 164, such as a length of the road segment 164 and a road quality of the road segment 164. In another example, the information can be used to determine contextual features describing the road segment 164, such as when the information was collected by the sensors in the sensor suite 166 (e.g., time of day, day, etc.) and weather conditions experienced while the information was collected by the sensors in the sensor suite 166. In some instances, rather than having a sensor suite, a vehicle may be equipped with a computing device that includes a number of integrated sensors. In such instances, sensors in the computing device can collect information that can be used by the vehicle to understand and navigate a given environment. In various embodiments, information collected by the integrated sensors can similarly be used to determine features (e.g., objects, road features, and contextual features) for a given road segment. For example, a mobile phone placed inside of the vehicle 162 may include integrated sensors (e.g., a global positioning system (GPS), optical camera, compass, gyroscope(s), accelerometer(s), and inertial measurement unit(s)) which can be used to capture information and determine features for the road segment 164.

As mentioned, information collected by sensors can be used to identify features for a given road segment. In some embodiments, the detection of certain features can be used to determine scenarios occurring on or along a given road segment. For example, a scenario may be defined as a pre-defined combination of features that may involve, for example, one or more objects or object identifiers, one or more road features, one or more contextual features, or some combination thereof. As just one example, a scenario can describe a person riding a bicycle on a rainy day. As another example, a scenario can describe a person in a wheelchair who is crossing a road segment. However, scenarios need not be identified (or counted) based on pre-defined criteria (or pre-defined combinations of features) alone. For example, new scenarios and corresponding scenario types may be identified and classified even if those scenarios (or scenario types) do not have a sufficient (or threshold) amount of similarity to a known scenario (or scenario type), for example, as stored in a scenario information database. Thus, in some embodiments, a system can determine that a grouping of identified features are more similar to one another than any existing scenario (or scenario type) and may generate a new scenario and/or scenario type for those features. These identified features may include an identified object (or object type), geographic features, road features (e.g., intersection type, presence of intersection traffic control (e.g., stop sign, yield sign, etc.), presence of intersection pedestrian control, lane boundary type, type of lane use, lane width, roadway alignment, roadway classification, roadway features, roadway grade, roadway lane count, roadway parking, roadway zones, speed limit, roadway surface type, roadway traffic way type, and route-based intersection context information (e.g., U-turn, etc.)), to name some examples. Many different scenarios are possible. Scenarios determined for a road segment can be logged and associated with the road segment. In some embodiments, other information can be logged and associated with the road segment including, for example, a date, time, and any other relevant contextual information that may affect the occurrence of events associated with the road segment or use of a road segment (e.g., weather, day, time, holiday, weekend, weekday, etc.). Further, in some embodiments, scenarios logged for a given road segment can be used to categorize the road segment. For example, a road segment for which a set of scenarios were logged can be categorized as a particular road segment type based on a threshold level of similarity between scenarios logged for the road segment and scenario types associated with the particular road segment type. Once categorized, the road segment can be associated with information describing its corresponding road segment type, such as a risk profile. A risk profile determined for a road segment can be used to inform driving and navigation behavior of a vehicle in relation to the road segment (or a series of road segments along a route or multiple routes associated with the vehicle). In some instances, classifying road segments based on scenario exposure data can be cumbersome. For example, a vast amount of scenario exposure data may need to be collected for road segments before those road segments can be classified. Thus, in some embodiments, rather than relying on scenario exposure data, a system may determine road segment similarity based on a comparison of features (e.g., road features, etc.). More details relating to the present technology are provided below.

Figure 2:
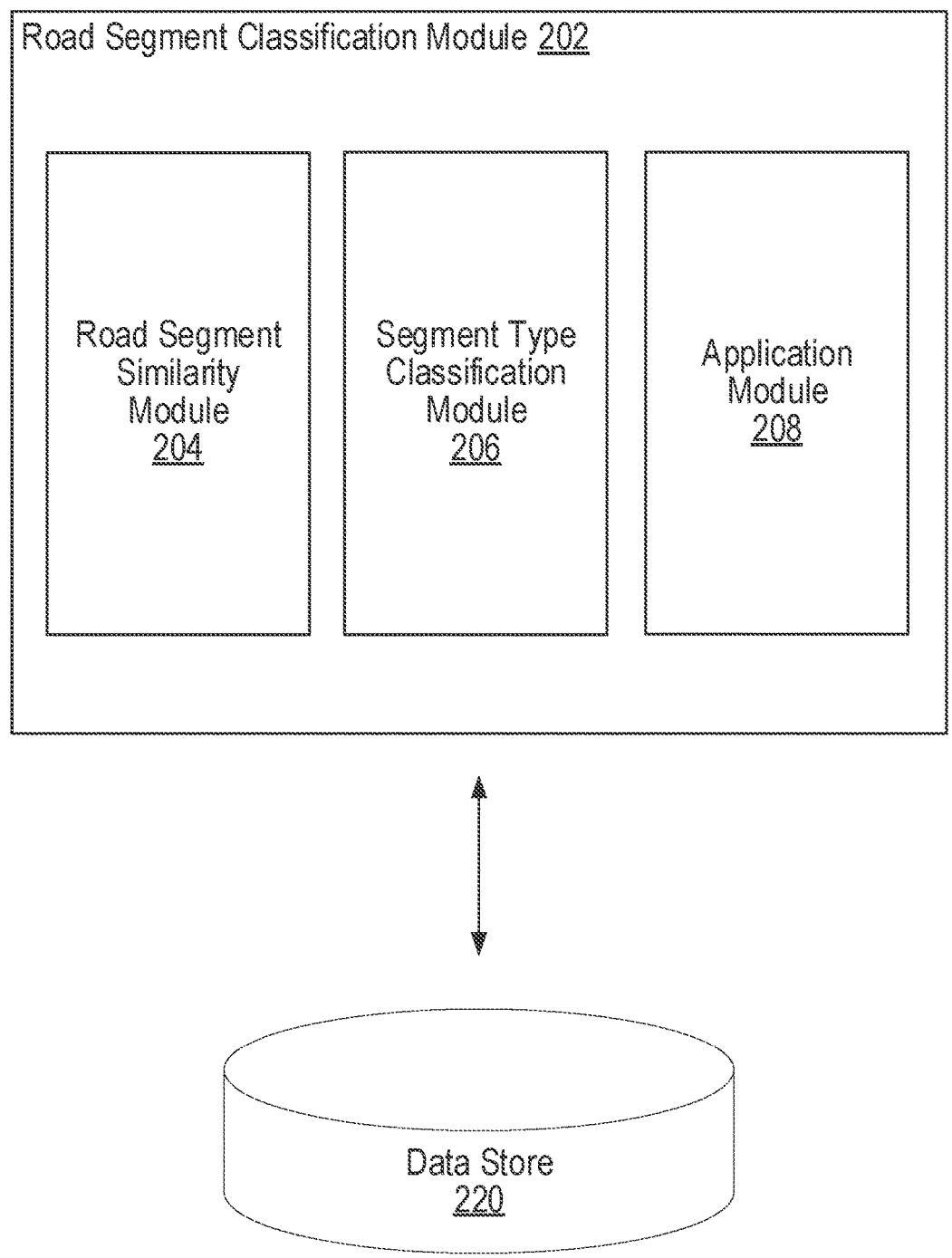
FIG. 2 illustrates an example road segment classification module, according to an embodiment of the present technology.

FIG. 2 illustrates an example system 200 including an example road segment classification module 202, according to an embodiment of the present technology. As shown in the example of FIG. 2, the road segment classification module 202 can include a road segment similarity module 204, a segment type classification module 206, and an application module 208. In some instances, the example system 200 can include at least one data store 220. In some embodiments, some or all data stored in the data store 220 can be stored by a transportation management system 960 of FIG. 9. In some embodiments, some or all data stored in the data store 220 can be stored by the vehicle 940 of FIG. 9. The components (e.g., modules, elements, etc.) shown in this figure and all figures herein are exemplary only, and other implementations may include additional, fewer, integrated, or different components. Some components may not be shown so as not to obscure relevant details. In some embodiments, some or all of the functionality performed by the road segment classification module 202 and its sub-modules may be performed by one or more backend computing systems, such as the transportation management system 960 of FIG. 9. In some embodiments, some or all of the functionality performed by the road segment classification module 202 and its sub-modules may be performed by one or more computing systems implemented in a vehicle, such as the vehicle 940 of FIG. 9. As discussed in more detail in reference to FIG. 7, in various embodiments, sensor data, raw or processed, can be processed by a vehicle or by an off-board computing system for scenario classification or feature identification.

The road segment classification module 202 can be configured to communicate and operate with the at least one data store 220, as shown in the example system 200. The at least one data store 220 can be configured to store and maintain various types of data. For example, the data store 220 can store information describing road segment types and respective information associated with the road segment types. For example, the data store 220 can store information describing a road segment type and a set of scenario types that are associated with the road segment type. The data store 220 can also store information such as corresponding risk profiles for road segment types. In some embodiments, a risk profile for a road segment type can be based on respective probabilities of various scenario types occurring while a vehicle navigates a road segment that has been categorized as the road segment type. In some embodiments, a risk profile for a road segment type can be based on one or more scenario exposures for the road segment type and some unit measuring distance. As just one example, a risk profile for a road segment type can indicate in relation to a scenario exposure that the road segment type exposes a vehicle to five jaywalkers per mile. In some embodiments, a risk profile for a road segment type can be associated with information describing operations to be performed by vehicles for mitigating scenario types or scenario exposures when navigating road segments corresponding to the road segment type. For example, a risk profile for a road segment type may be associated with generation of instructions or commands that cause a vehicle to navigate autonomously or semi-autonomously in accordance with the risk profile, such as decreasing its speed to a pre-defined speed limit when navigating road segments that have been categorized as the road segment type. In an embodiment, the instructions or commands can be provided to a human driver of a manually-driven vehicle. In an embodiment, the instructions or commands can include control commands for one or more actuators associated with a vehicle as determined based on the risk profile. In an embodiment, risk profiles can be determined based on historical ride information, for example, as stored and managed by a transportation management system (e.g., the transportation management system 960 of FIG. 9). In an embodiment, historical ride information can be used to identify risks to human drivers. For example, scenario types can be cross-correlated with geographic regions within which accidents or claims have occurred in the past. In some embodiments, some or all data stored in the data store 220 can be stored by the transportation management system 960 of FIG. 9. In some embodiments, some or all data stored in the data store 220 can be stored by the vehicle 940 of FIG. 9. More details about information that can be stored in the data store 220 are provided below.

The road segment similarity module 204 can be configured to determine respective similarities between a pair of road segments or between a road segment and a road segment type. For example, in some embodiments, a similarity between a classified road segment (i.e., a road segment associated with a risk profile and scenario exposure rates) and an unclassified road segment (i.e., a road segment that is not associated with a risk profile or scenario exposure rates) may be determined based on a comparison of their features (e.g., road features, etc.). When a threshold level of similarity between the classified road segment and the unclassified road segment is determined, various information associated with the classified road segment can also be associated with the unclassified road segment. For instance, the unclassified road segment can be associated with a risk profile that corresponds to the classified road segment. Similarly, in some embodiments, a similarity between a road segment type (i.e., a road segment type associated with a risk profile and scenario exposure rates) and an unclassified road segment (i.e., a road segment that is not associated with a risk profile or scenario exposure rates) may also be determined based on a comparison of their features (e.g., road features, etc.). When a threshold level of similarity between the road segment type and the unclassified road segment is determined, various information (e.g., scenario information such as scenarios, scenario exposure rates) associated with the road segment type can also be associated with the unclassified road segment. For instance, the unclassified road segment can be associated with a risk profile that corresponds to the road segment type. More details regarding the road segment similarity module 204 will be provided below with reference to FIG. 3A.

The segment type classification module 206 can be configured to categorize (or classify) road segments into road segment types. For example, in some embodiments, the segment type classification module 206 can identify a road segment being navigated by a vehicle. The segment type classification module 206 can also determine that the identified road segment corresponds to some road segment type. When categorized as the road segment type, the identified road segment can also be associated with various information describing its corresponding road segment type. For instance, the identified road segment can be associated with a risk profile for the road segment type. Such associated information can be used by a vehicle to gain various insights into the identified road segment that would not otherwise be readily available to the vehicle. More details regarding the segment type classification module 206 will be provided below with reference to FIG. 3B.

The application module 208 can be configured to use information determined by the road segment similarity module 204 and the segment type classification module 206 for various applications. In some embodiments, such information can be used to generate a value of an aggregate risk for a fleet of vehicles operating in a geographic region (e.g., a city, county, zip code, state, country, or some other defined geographic region). In an embodiment, the aggregate risk can be determined based on historical ride information, for example, as stored and managed by a transportation management system (e.g., the transportation management system 960 of FIG. 9). For example, in some embodiments, a value corresponding to an aggregate risk for a fleet of vehicles may be determined based on a combination (e.g., product) of (1) a value relating to a fleet exposure to scenario type, (2) a value relating to an efficacy of self-driving system in view of scenario type, and (3) a value relating to a severity of adverse outcome. In this regard, the aggregate risk for a fleet of vehicles operating in a geographic region can be based on individual assessments of risk, or risk profiles, associated with a simulation of how a vehicle performs on road segments in the geographic region and their respective scenario exposure rates. In some embodiments, the value relating to a fleet exposure to scenario type can be determined based on an exposure of the fleet to the scenario type while navigating road segments in the geographic region for which the value of the aggregate risk is being determined. For example, the geographic region may include a first road segment type and a second road segment type. In this example, a vehicle traveling on the first road segment type may be exposed to five jaywalkers per mile while a vehicle traveling on the second road segment type may be exposed to one jaywalker per mile. Here, if the fleet of vehicles drives 100 miles on the first road segment type, the fleet can be expected to encounter 500 instances jaywalking. Similarly, if the fleet drives 100 miles of the second road segment type, the fleet can be expected to encounter 100 instances of jaywalking. Using this approach, an aggregate scenario exposure of the fleet to various scenario types can be determined. In some embodiments, the value relating to an efficacy of an autonomously, semi-autonomously, or manually driven vehicle (or system) in view of scenario type measures a probability of a fleet vehicle experiencing a traffic collision while navigating the geographic region for which the value of the aggregate risk is being determined. In some embodiments, the value relating to efficacy can be determined for the geographic region based on sensor data logged by vehicles while navigating the geographic region. In such embodiments, simulated behavior of vehicles can be evaluated with respect to real-world scenarios that were encountered by vehicles while navigating the geographic region. Other approaches for measuring efficacy are possible. For example, in some embodiments, real-world sensor data for certain scenarios may not be available. In such instances, the value relating to efficacy can be determined by structuring scenarios (or tests) at a test facility to log corresponding sensor data and then evaluating a simulation of vehicles against this sensor data. In some instances, it may not be feasible to structure scenarios (or tests) for purposes of measuring efficacy. Thus, in another example, the value relating to efficacy can be determined by programmatically generating scenario instances in a simulated world and then evaluating a simulation of vehicles against the programmatically generated scenario instances. In some embodiments, the value relating to a severity of adverse outcome can be determined based on simulated collisions involving vehicles. These simulated collisions can be associated with collision parameters that measure human injury or property damage resulting from the simulated collisions. In some embodiments, the aggregate risk for the fleet of vehicles for the geographic region can be used to determine when to deploy the fleet of vehicles within the geographic region.

In another example, the application module 208 can use information determined by the segment type classification module 206 to determine similarities between geographic regions (e.g., cities, counties, zip codes, states, countries, or some other defined geographic region). For example, assume a first geographic region (e.g., a first city) and a second geographic region (e.g., a second city) have been determined to be similar based on their respective types of road segments. Assume further that certain information has been determined for the first geographic region. The certain information can include, for example, a collective risk profile associated with the types of road segments of the first geographic region, an aggregate scenario exposure associated with the types of road segments of the first geographic region, or a value of an aggregate risk for a fleet of vehicles operating in the first geographic region. In this example, based on determined similarity between the first geographic region and the second geographic region, the collective risk profile, the aggregate scenario exposure, and the aggregate fleet risk corresponding to the first geographic region can be applied to the second geographic region. In this manner, substantial savings in time and computing resources can be achieved in generating vital information about the second geographic region based on the determined geographic similarity.

Figure 3A:
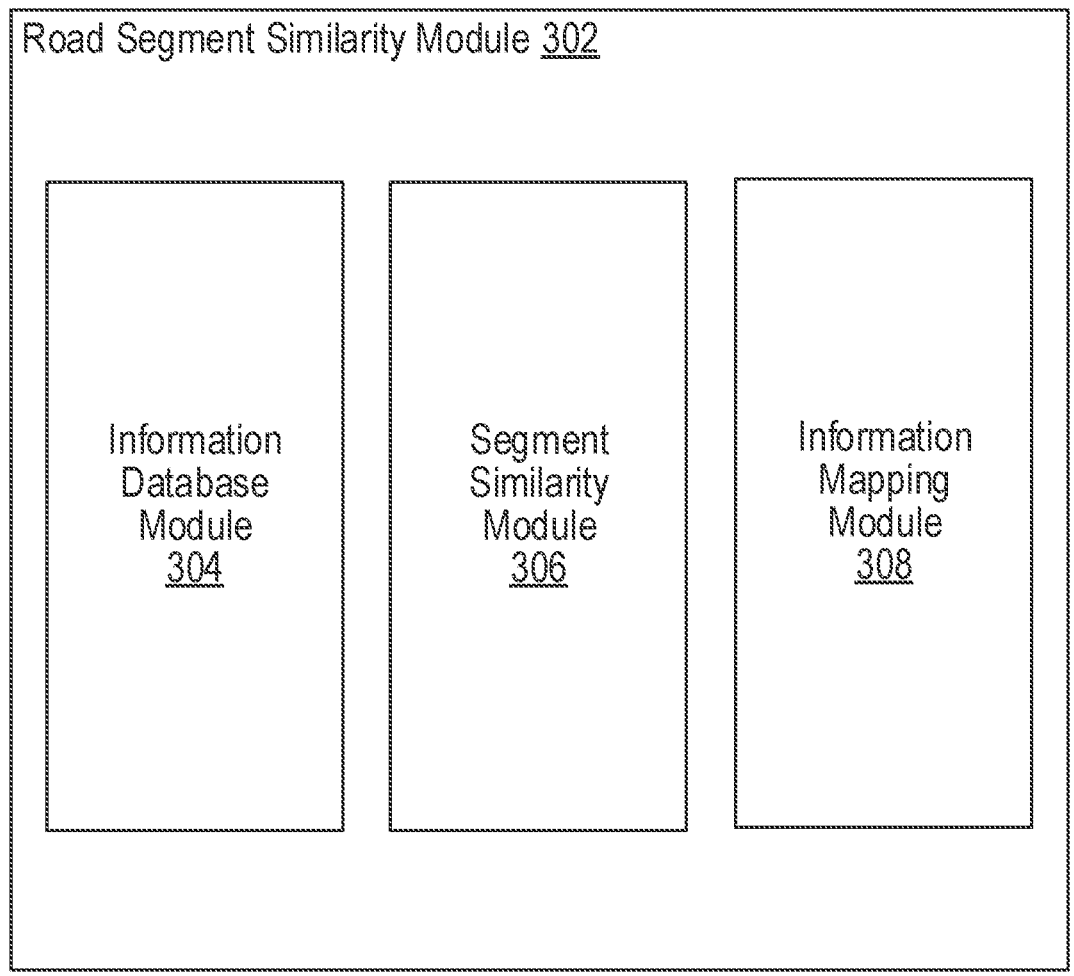
FIG. 3A illustrates an example road segment similarity module, according to an embodiment of the present technology.

FIG. 3A illustrates an example road segment similarity module 302, according to an embodiment of the present technology. In some embodiments, the road segment similarity module 204 of FIG. 2 can be implemented with the road segment similarity module 302. The road segment similarity module 302 can be configured to determine similarities between road segments. For example, in some embodiments, a similarity between a classified road segment and an unclassified road segment may be determined based on a comparison of their features (e.g., road features, etc.). When a threshold level of similarity between the classified road segment and the unclassified road segment is determined, various information associated with the classified road segment can also be associated with the unclassified road segment. For instance, the unclassified road segment can be associated with a risk profile that corresponds to the classified road segment. Similarly, the road segment similarity module 302 can be configured to determine similarities between road segments and road segment types. For example, in some embodiments, a similarity between a road segment type and an unclassified road segment may be determined based on a comparison of their features (e.g., road features, etc.). When a threshold level of similarity between the road segment type and the unclassified road segment is determined, various information associated with the road segment type can also be associated with the unclassified road segment. As shown in the example of FIG. 3A, the road segment similarity module 302 can include an information database module 304, a segment similarity module 306, and an information mapping module 308.

The information database module 304 can be configured to access and manage a scenario information database. For example, the scenario information database may be accessible through a data store, such as the data store 220 of FIG. 2. In some embodiments, the scenario information database may be generated as part of a first phase in a multi-phase process. In some embodiments, the scenario information database can include (i) real world sensor data and features corresponding to road segments (e.g., highly sampled, classified road segments) in geographic areas comprising a variety of different road segment types, (ii) scenario classification and identification information based on collected real world sensor data for the variety of different road segment types, and (iii) risk profiles associated with the different classified scenarios and scenario types. The sensor data that constitutes a foundation for the scenario information database can be acquired and maintained in the first phase of the multi-phase process through, for example, sampling via sensors on vehicles that have driven along the road segments described by the data in the scenario information database.

The segment similarity module 306 can be configured to determine respective similarities between classified (or highly sampled) road segments and unclassified (or less frequently sampled) road segments. The segment similarity module 306 can determine a threshold level of similarity or matching between a classified road segment and an unclassified road segment. Satisfaction of the threshold level of similarity between road segments can result in a determination of similarity between the road segments. Similarly, the segment similarity module 306 can determine a threshold level of similarity or matching between a road segment type and an unclassified road segment. Satisfaction of the threshold level of similarity between the road segment type and the unclassified road segment can result in a determination of similarity between the road segment type and the road segment. In some embodiments, similarities between road segments (or between a road segment and a road segment type) can be determined as part of a second phase in the multi-phase process. In such embodiments, information (e.g., features, scenarios, contextual data, etc.) stored in the scenario information database can be used to determine similarities between road segments. For example, the segment similarity module 306 may determine a similarity between a first road segment and a second road segment based on a comparison of their features (e.g., road features, etc.). In some embodiments, road features may include sampled (or collected) information describing objects associated with a given road segment as well as any permanent and ephemeral features associated with the road segment. Other examples of road features include geographic attributes (e.g., a shape or path of a road segment—straight, curved, etc.), metadata associated with the road segment (e.g., map features, zoning, surrounding businesses, census tracts, etc.), and detailed sensor data related to the configuration of the road segment (e.g., lane types, lane widths, existence of stop signs, etc.). Such road features may be considered permanent or semi-permanent features associated with the road segment. The segment similarity module 306 may use other types of features when determining road segment similarity. For example, in some embodiments, the segment similarity module 306 may use map data that describes road configurations (e.g., lane types, lane widths, existence of stop signs, etc.). In some embodiments, the segment similarity module 306 can use visual data describing road segments (e.g., street view images, point clouds, etc.). In some embodiments, the segment similarity module 306 may also use sensor and scenario information that has been collected from road segments, if any, as an additional consideration when determining road segment similarity. For example, if a bus is determined to be present fifty percent of the time that a vehicle passes a road segment, that determination (or feature) may be used in addition to other features when determining road segment similarity. In some embodiments, the segment similarity module 306 can compare features associated with an unclassified road segment to features associated with road segments (or road segment types) in the scenario information database of known and classified road segments to identify a set of most similar road segments (or road segment types) for the unclassified road segment. Once the set of most similar road segments (or road segment types) for the unclassified road segment is determined, the scenario exposure rates for the unclassified road segment can be determined using scenario exposure rates that are known to be associated with the set of most similar road segments. As a result, many road segments can be evaluated for similarity and scenario exposure rates without having to individually and extensively sample (or drive) those road segments.

In some embodiments, once a threshold level of similarity or matching between a classified road segment and an unclassified road segment is determined, the information mapping module 308 can determine information associated with the classified road segment. The information mapping module 308 can then associate the determined information with the unclassified road segment. For example, in some embodiments, the classified road segment may be associated with a risk profile that is based on scenario exposure rates for the classified road segment. In this example, the information mapping module 308 can associate the risk profile with the unclassified road segment based upon the threshold similarity determination between the classified road segment and the unclassified road segment.

Figure 3B:
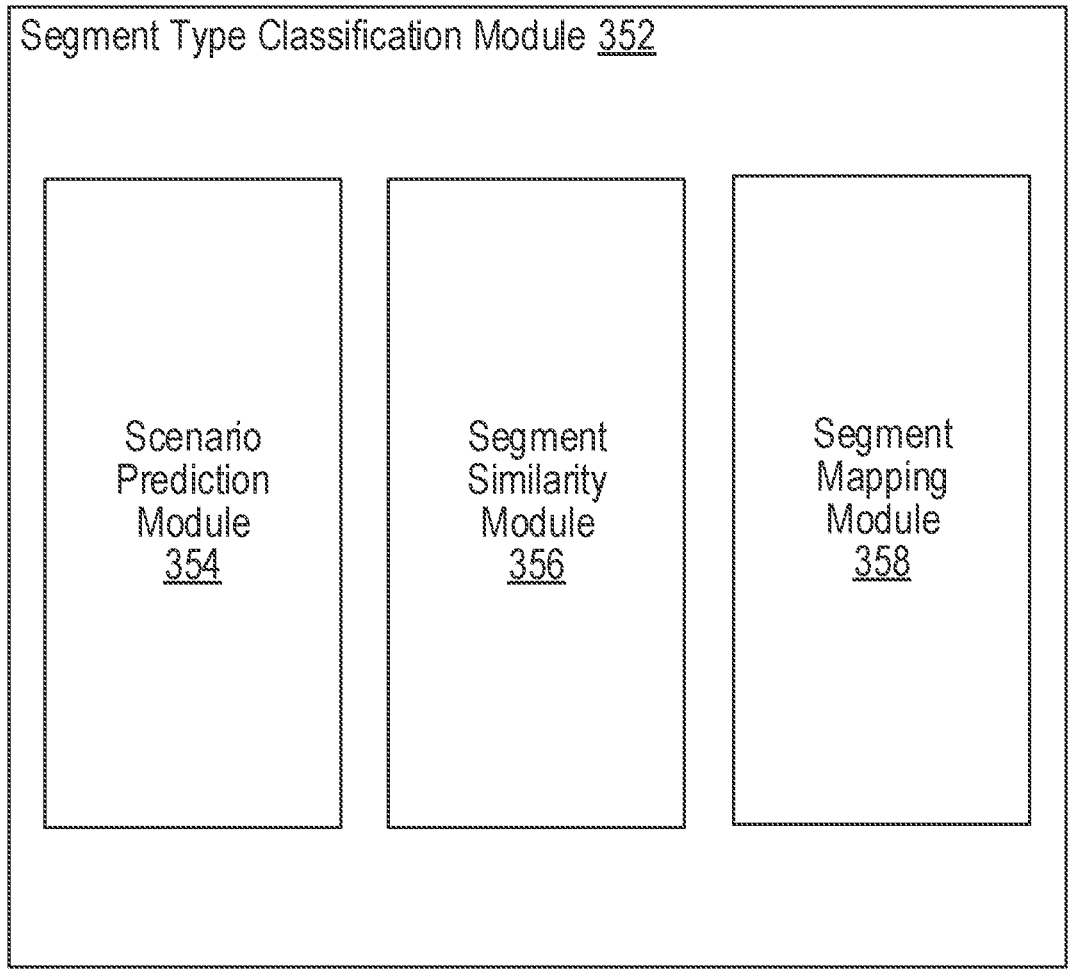
FIG. 3B illustrates an example segment type classification module, according to an embodiment of the present technology.

FIG. 3B illustrates an example segment type classification module 352, according to an embodiment of the present technology. In some embodiments, the segment type classification module 206 of FIG. 2 can be implemented with the segment type classification module 352. As mentioned, the segment type classification module 352 can be configured to evaluate and categorize road segments as road segment types. In some embodiments, the segment type classification module 352 can categorize a road segment as a road segment type based on a threshold level of similarity between scenarios determined for the road segment and scenario types associated with the road segment type. As shown in the example of FIG. 3B, the segment type classification module 352 can include a scenario prediction module 354, a segment similarity module 356, and a segment mapping module 358.

The scenario prediction module 354 can be configured to determine (or predict) scenarios for a road segment being categorized. In some embodiments, scenarios for the road segment can be determined based on, for example, one or more objects detected by a vehicle traveling on the road segment, one or more road features describing the road segment, one or more contextual features corresponding to the road segment, or a combination thereof. More details regarding the scenario prediction module 354 will be provided below with reference to FIG. 4.

The segment similarity module 356 can be configured to determine a road segment type that is most similar to a road segment being categorized. In some embodiments, a road segment can be categorized as a road segment type when a set of scenarios determined (or predicted) for the road segment have a threshold level of similarity to scenario types associated with the road segment type. More details regarding the segment similarity module 356 will be provided below with reference to FIG. 5.

The segment mapping module 358 can be configured to categorize (or map) a road segment as a given road segment type. For example, a road segment that is determined to correspond to a given road segment type can be associated with various information that is relevant to that road segment type. In some embodiments, this associated information can include, for example, a risk profile corresponding to the road segment type and instructions for operating a vehicle when navigating road segments that correspond to the road segment type.

Figure 4:
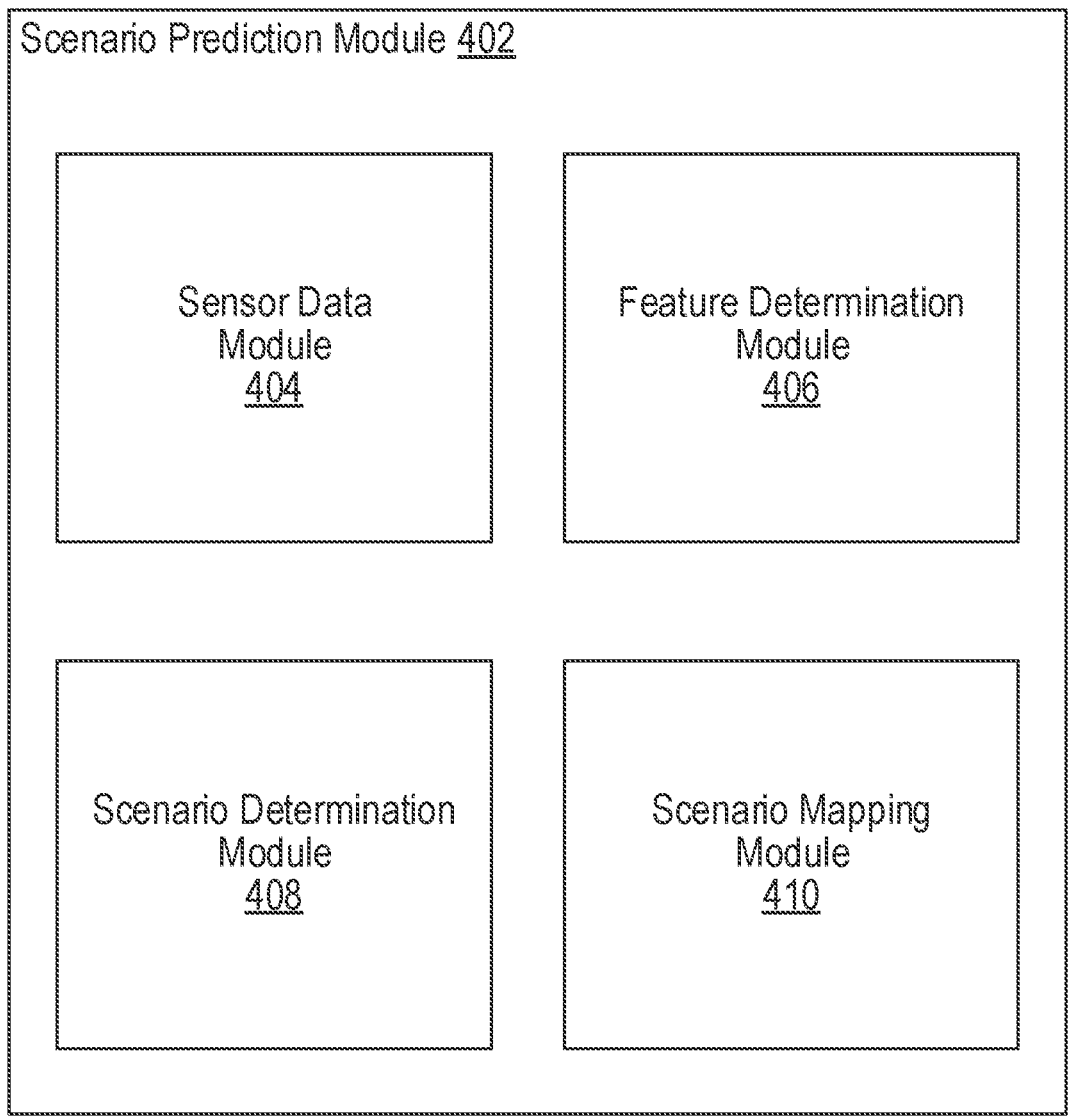
FIG. 4 illustrates an example scenario prediction module, according to an embodiment of the present technology.

FIG. 4 illustrates an example scenario prediction module 402, according to an embodiment of the present technology. In some embodiments, the scenario prediction module 354 of FIG. 3B can be implemented with the scenario prediction module 402. As mentioned, the scenario prediction module 402 can be configured to determine (or predict) scenarios for a given road segment. In some embodiments, a scenario may be determined (or predicted) for a road segment based on a combination of specific factors involving the presence of, for example, one or more objects detected on the road segment, one or more road features corresponding to the road segment, and one or more contextual features describing the road segment. In some embodiments, scenarios predicted for a road segment can be used to determine whether the road segment can be categorized as some pre-defined road segment type. As shown in the example of FIG. 4, the scenario prediction module 402 can include a sensor data module 404, a feature determination module 406, a scenario determination module 408, and a scenario mapping module 410.

The scenario prediction module 402 can be configured to communicate and operate with a data store, such as the data store 220. For example, the data store 220 can store sensor data collected by vehicles. In some embodiments, the sensor data can be labeled based on a geographic location from which the sensor data was collected. For example, sensor data collected by sensors in a vehicle while navigating a given road segment can be associated with that road segment. The data store 220 can also store pre-defined scenario data that can be used to recognize and identify scenarios. For instance, a given scenario can be associated with a set of features (e.g., objects or object identifiers, road features, contextual features) which, when detected on a road segment, can be used (in real time or near real time) by a vehicle to recognize and log the scenario in association with the road segment. In some embodiments, scenarios may be organized in a multi-level or tiered taxonomy reflecting various degrees of generality and specificity. For example, the data store 220 may store the taxonomy and information describing pre-defined scenario types, scenarios (or scenario instances) included within those scenario types as well as related attributes and attribute values, and respective features that can be used to identify a given scenario. For example, a scenario type corresponding to "pedestrian actions" can include scenarios such as a child running across a road and people jogging along a road, to name some examples. In these examples, the scenario "child running across the road" may be associated with features that can be used to recognize the scenario, such as the presence of an object corresponding to a child, a speed at which the object is traveling (e.g., 2-4 miles per hour), and a direction in which the object is traveling (e.g., a path substantially orthogonal to the path of the road). Many different scenarios based on different features are possible.

The sensor data module 404 can be configured to obtain sensor data corresponding to a road segment to be categorized. For example, the sensor data may include data captured by one or more sensors including optical cameras, LiDAR, radar, infrared cameras, and ultrasound equipment, to name some examples. The sensor data module 404 can obtain such sensor data, for example, from the data store 220 or directly from sensors associated with a vehicle in real-time. In some instances, the obtained sensor data may have been collected by a driver-operated vehicle included in a fleet of vehicles that offer ridesharing services. For example, in some embodiments, the driver-operated vehicle may include a computing device (e.g., mobile phone) that includes one or more integrated sensors (e.g., a global positioning system (GPS), compass, gyroscope(s), accelerometer(s), and inertial measurement unit(s)) that can be used to capture information describing a given road segment. In some embodiments, the sensor data module 404 can determine contextual information for sensor data such as a respective calendar date, day of week, and time of day during which the sensor data was captured. Such contextual information may be obtained from an internal clock of a sensor or a computing device, one or more external computing systems (e.g., Network Time Protocol (NTP) servers), or GPS data, to name some examples. More details describing the types of sensor data that may be obtained by the sensor data module 404 are provided below in connection with an array of sensors 944 of FIG. 9.

The feature determination module 406 can be configured to determine features that correspond to a road segment being categorized. Such features can include, for example, objects detected on the road segment, road features corresponding to the road segment, and contextual features describing the road segment. For example, in some embodiments, the feature determination module 406 can analyze sensor data obtained by the sensor data module 404 to identify objects detected on or along the road segment being categorized. When identifying features such as objects, the feature determination module 406 can apply generally known object detection and recognition techniques. The identified objects can include, for example, pedestrians, vehicles, lane markings, curbs, trees, animals, debris, etc. In some embodiments, the feature determination module 406 can determine respective attributes for each of the identified objects. For example, upon detecting a pedestrian, the feature determination module 406 can determine attributes related to the pedestrian. In this example, the attributes can include a distance between the pedestrian and a vehicle that is sensing (or detecting) the pedestrian, a velocity at which the pedestrian is traveling, and a direction in which the pedestrian is traveling, to name some examples. In some embodiments, the attributes can also describe the vehicle that is sensing (or detecting) the pedestrian including, for example, a velocity at which the vehicle is traveling, a direction in which the vehicle is traveling, and a lane within which the vehicle is traveling.

The feature determination module 406 can also determine road features corresponding to a road segment being categorized. As mentioned, these road features can be used to determine (or predict) scenarios for the road segment. In some embodiments, such road features may be determined from sensor data obtained from, for example, the sensor data module 404, location data (e.g., labeled map data, GPS data, etc.), or a combination thereof. For example, in some embodiments, the feature determination module 406 can determine road features such as road segment length (e.g., a start point and an end point that defines a road segment), road segment quality (e.g., presence of potholes, whether the road segment is paved or unpaved, etc.), roadway type (e.g., freeway, highway, expressway, local street, rural road, etc.), information describing traffic lanes in the road segment (e.g., speed limits, number of available lanes, number of closed lanes, locations of any intersections, merging lanes, traffic signals, street signs, curbs, etc.), the presence of any bike lanes, and the presence of any crosswalks, to name some examples. In some embodiments, the feature determination module 406 can also determine whether the road segment is within a specific zone (e.g., residential zone, school zone, business zone, mixed-use zone, high density zone, rural zone, etc.), for example, based on detected street signs and location data.

The feature determination module 406 can also determine contextual features that correspond to a road segment being categorized. As mentioned, the contextual features can be used to determine (or predict) scenarios for the road segment. In some embodiments, such contextual features may be determined from sensor data obtained from, for example, the sensor data module 404, external data sources (e.g., weather data, etc.), or a combination thereof. For example, in some embodiments, the feature determination module 406 can analyze sensor data (e.g., images, videos, LiDAR data, radar data, etc.) corresponding to a road segment being categorized. In such embodiments, the feature determination module 406 can determine contextual features based on the sensor data. For example, in some embodiments, the feature determination module 406 can determine a respective calendar date, day of week, and time of day during which the sensor data was captured. In some embodiments, the feature determination module 406 can determine weather conditions (e.g., clear skies, overcast, fog, rain, sleet, snow, etc.) encountered while navigating the road segment based on the sensor data.

The scenario determination module 408 can be configured to determine (or predict) scenarios for a road segment being categorized. For example, the scenario determination module 408 can determine (or predict) scenarios for a road segment based on features determined for the road segment by the feature determination module 406. In some embodiments, the scenario determination module 408 determines (or predicts) scenarios based on pre-defined rules. In such embodiments, the scenario determination module 408 can determine whether features associated with a road segment being categorized match pre-defined features associated with a given scenario. In some embodiments, a road segment can be associated with a scenario when all of the features associated with the road segment match features associated with the scenario. For example, assume a first scenario for "School Bus Stopping" is associated with features of a school bus with active hazard lights along with the presence of a stop sign. Assume further that sensor data for a road segment indicates the presence of features corresponding to a school bus with its hazard lights in use and the presence of a stop sign. In this example, the scenario determination module 408 may determine (or predict) that the presence of the school bus with active hazard lights and the presence of the stop sign match the features associated with the first scenario. In some instances, a scenario can be associated with a road segment even if all features associated with the road segment do not exactly match all features associated with the scenario. For example, in some embodiments, a road segment can be associated with a scenario when a threshold level of similarity is determined between features associated with the road segment and features associated with the scenario. For example, when a threshold number of features associated with a road segment and features associated with a scenario match, the road segment can be associated with the scenario. Many variations are possible.

Other approaches for determining (or predicting) scenarios for road segments are contemplated by the present technology. For example, in some embodiments, a machine learning model can be trained to predict scenarios for a road segment based on features determined for the road segment. As another example, in various embodiments, features determined for a road segment can be represented as a vector. Similarly, features associated with a scenario can also be represented as a vector. In such embodiments, the road segment can be associated with the scenario based on satisfaction of a threshold level of similarity (e.g., cosine similarity) between their vector representations.

The scenario mapping module 410 can associate road segments with their respective scenarios. Associations between a road segment and its respective scenarios can be determined (or predicted) by the scenario determination module 408, as discussed. In some embodiments, information describing associations between a road segment and its corresponding one or more scenarios can be stored, for example, in the data store 220.

Figure 5:
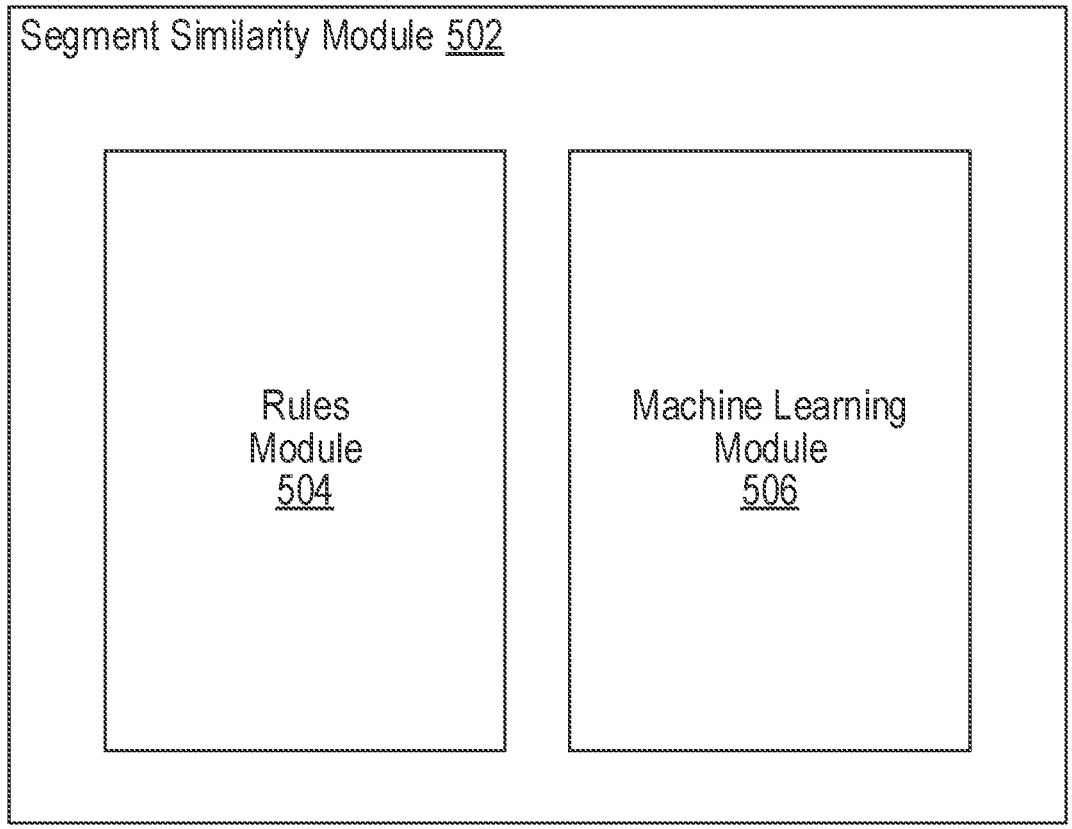
FIG. 5 illustrates an example segment similarity module, according to an embodiment of the present technology.

FIG. 5 illustrates an example segment similarity module 502, according to an embodiment of the present technology. In some embodiments, the segment similarity module 356 of FIG. 3B can be implemented with the segment similarity module 502. The segment similarity module 502 can be configured to determine one or more road segment types that have a threshold level of similarity to a road segment being categorized. In some embodiments, the road segment can be categorized as a road segment type that is most similar to the road segment, for example, as determined based on a comparison of scenarios determined for the road segment and scenarios associated with the road segment type. Such scenario comparisons may be performed using various approaches. As shown in the example of FIG. 5, the segment similarity module 502 can include a rules module 504 and a machine learning module 506.

The rules module 504 can be configured to determine one or more road segment types that have a threshold level of similarity to a road segment being categorized based on pre-defined rules. In some embodiments, the road segment may be determined to have a threshold level of similarity to a road segment type when at least one scenario determined for the road segment matches at least one scenario included in a scenario type associated with the road segment type or otherwise falls within the scope of the scenario type. As used herein, a "scenario type" can include instances of corresponding scenarios, any attribute types related to those scenarios, and any attribute values related to those attribute types. In other embodiments, a threshold level of similarity determination may be made when scenarios determined for the road segment match a threshold number of scenarios included in a scenario type associated with the road segment type. For example, a road segment type may be associated with a first scenario type that includes a first scenario (e.g., a person bicycling across the road segment), a second scenario (e.g., a jaywalker crossing the road segment), and a third scenario (e.g., animals crossing the road segment). A road segment being categorized may be associated with the first scenario (e.g., a person bicycling across the road segment) and the second scenario (e.g., a jaywalker crossing the road segment) but not the third scenario (e.g., animals crossing the road segment). In this example, if a threshold level of similarity requires a match of at least two scenarios as between a road segment being categorized and a road segment type, a threshold level of similarity between the road segment and road segment type may be determined to exist despite the road segment not being associated with the third scenario (e.g., animals crossing the road segment). Many variations are possible. For example, in some embodiments, a road segment type for a road segment may be determined when a scenario exposure determined for the road segment matches a scenario exposure associated with the road segment type with a threshold level of similarity. For example, assume a road segment has a scenario exposure of 15 jaywalkers per mile and a road segment type has a scenario exposure of 14 jaywalkers per mile. In this example, the road segment can be categorized as the road segment type assuming a threshold level of similarity is satisfied between the scenario exposure of the road segment and the scenario exposure of the road segment type. In some embodiments, a road segment type for a road segment may be determined when an aggregate scenario exposure determined for the road segment matches an aggregate scenario exposure associated with the road segment type with a threshold level of similarity. For example, assume a road segment has a first scenario exposure of 15 jaywalkers per mile and a second scenario exposure of 9 roaming animals per mile. Further, assume a road segment type has a first scenario exposure of 14 jaywalkers per mile and a second scenario exposure of 10 roaming animals per mile. In this example, an aggregate scenario exposure for the road segment can be determined based on an aggregation or combination of the first scenario exposure and the second scenario exposure associated with the road segment. Similarly, an aggregate scenario exposure for the road segment type can be determined based on an aggregation or combination of the first scenario exposure and the second scenario exposure associated with the road segment type. In this example, the road segment can be categorized as the road segment type assuming a threshold level of similarity is satisfied between the aggregate scenario exposure of the road segment and the aggregate scenario exposure of the road segment type. Again, many variations are possible.

The machine learning module 506 can be configured to determine road segment types that are similar to a road segment being categorized based on machine learning techniques. For example, in some embodiments, a machine learning model can be trained to predict road segment types that are similar to a given road segment to be categorized based on scenarios associated with the road segment. In such embodiments, scenarios associated with the road segment can be provided as inputs to the machine learning model. The machine learning model can evaluate these inputs to determine (or predict) a road segment type that best represents the road segment. Many variations are possible.

Figure 6A:
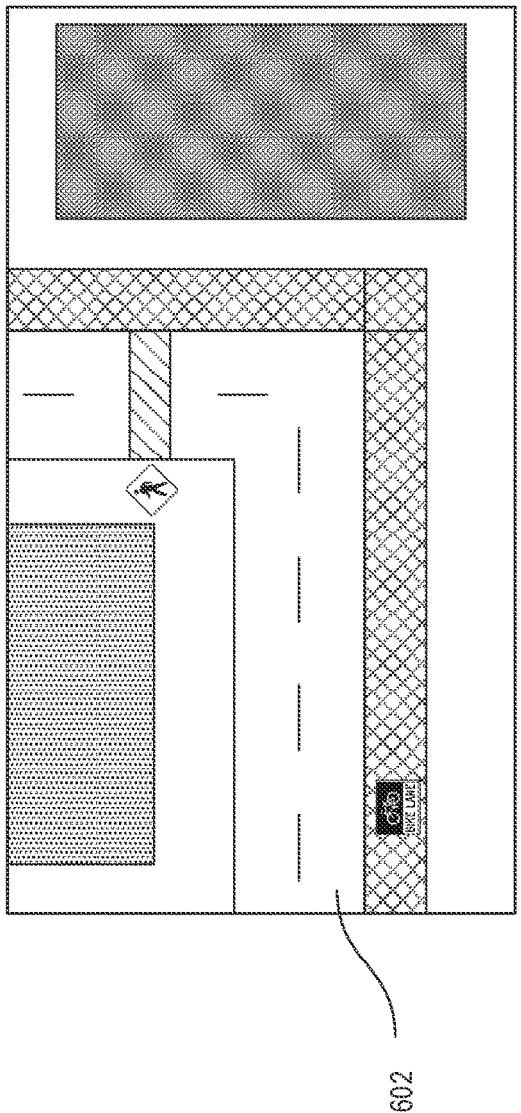
FIG. 6A illustrates example scenario types for a road segment, according to an embodiment of the present technology.

FIG. 6A illustrates example scenario types 604 determined (or predicted) for a road segment 602, according to an embodiment of the present technology. The example scenario types 604 may be determined by the road segment classification module 202 of FIG. 2. In some embodiments, scenario types can be organized as a multi-level or tiered taxonomy reflecting varying degrees of generality and specificity. An example taxonomy may include a set of pre-defined scenario types and respective scenarios classified within each of the scenario types. As shown, the road segment 602 is associated with a "Vehicle Action" scenario type 606, a "Pedestrian Action" scenario type 610, and a "Pedestrian Type" scenario type 614. The "Vehicle Action" scenario type 606 includes a scenario 608 corresponding to "School Bus Stopping". In this example, the scenario 608 is associated with a set of features ("School Bus", "Hazard Lights Active", "Crossing Guard") that can be used to recognize the scenario 608. In the example, the road segment 602 is also associated with the "Pedestrian Action" scenario type 610 which includes a scenario 612 corresponding to "Pedestrian Crossing Roadway Properly". The scenario 612 is associated with a set of features ("Pedestrian in crosswalk", "Crosswalk", "Crosswalk Street Sign") that can be used to recognize the scenario 612. In the example, the road segment 602 is also associated with the "Pedestrian Type" scenario type 614 which includes a scenario 616 corresponding to "Pedestrian with Baby Stroller". The scenario 616 is associated with a set of features ("Pedestrian", "Baby Stroller") that can be used to recognize the scenario 616. For ease of explanation, FIG. 6A shows example portions of the taxonomy organizing scenario types and respective scenarios. However, the taxonomy of the present technology can contain a large number (e.g., hundreds, thousands, etc.) of different scenario types and respective scenarios (or attribute types with attribute values) identified by a wide variety of features. Further, the taxonomy can designate scenario types and scenarios at varying levels of abstraction. As just one example, the example scenario types 604 illustrated in FIG. 6A alternatively can be characterized as scenarios or attribute types of a category corresponding to a broader scenario type, such as an "Experience Scenarios" scenario type. Many variations are possible.

Figure 6B:
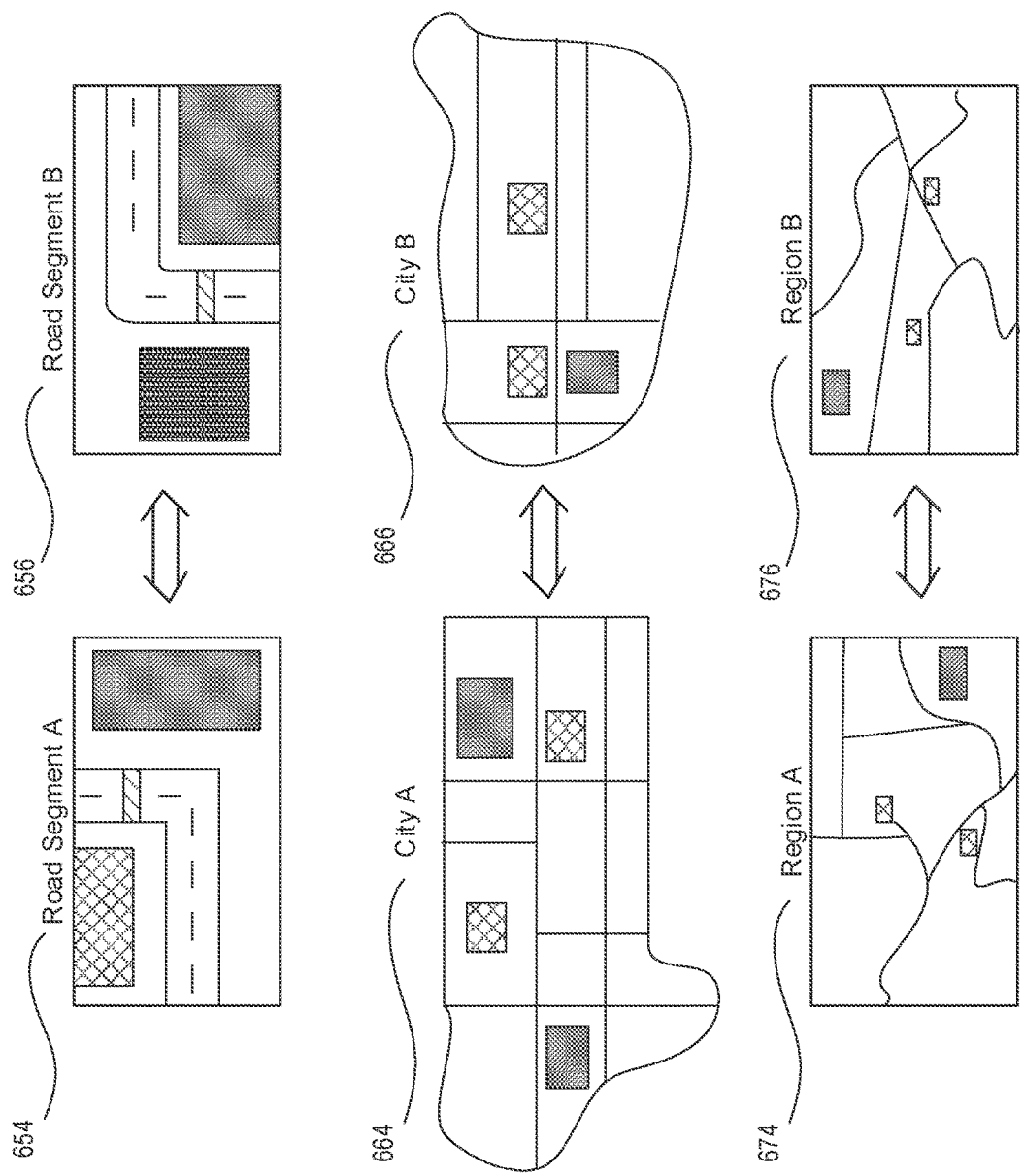
FIG. 6B illustrates example similarity mappings between various types of geographies, according to an embodiment of the present technology.

FIG. 6B illustrates example similarity mappings between various types of geographies, according to an embodiment of the present technology. The example similarity mappings may be determined by the road segment classification module 202 of FIG. 2. For example, in some embodiments, a road segment A 654 and a road segment B 656 can be determined to be similar based on their respective road segment type classifications. A road segment can be classified as a given road segment type based on scenarios determined for the road segment and scenario types associated with the road segment type, as described above. In some embodiments, similarities between different geographic locations or areas can be determined based on the types of road segments included within those geographic locations. For example, a city 664 may include road segments that correspond to a set of road segment types. A city 666 may also include road segments that correspond to a set of road segment types. In this example, a similarity between the city 664 and the city 666 can be determined based on an amount of overlap between road segment types included in the city 664 and road segment types included in the city 666. For example, the city 664 may have a particular mix of different types of road segments (e.g., urban one way streets with stop lights, double wide roads with sporadic pedestrian traffic in the morning, an interstate with heavy semi-truck traffic, etc.) that may overlap with (or may be completely different from) a mix of different types of road segments included in the city 666. In various embodiments, such comparisons can be used to determine similarities between other types or abstractions of geographic regions in general, such as zip codes, counties, states, or other defined geographic regions 674, 676. Further, when determined similarities between geographic regions satisfy an applicable threshold level of similarity, certain information known about some geographic regions can be assigned or applied to other geographic regions for which such information was not previously known, as described above in reference to the application module 208 of FIG. 2.

Figure 7A:
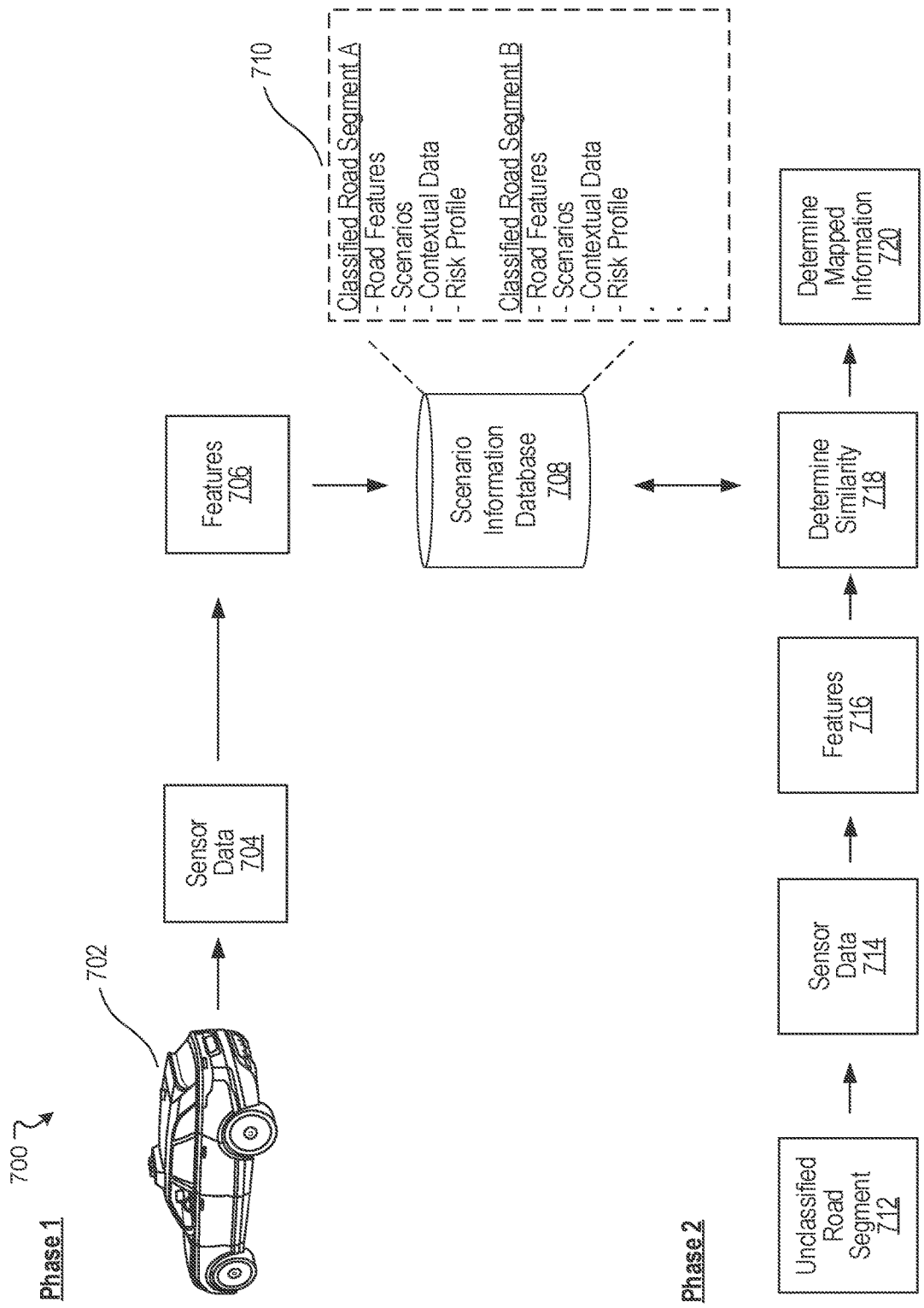
FIG. 7A illustrates an example multi-phase process for determining road segment similarity, according to an embodiment of the present technology.

FIG. 7A illustrates an example multi-phase process 700 for determining road segment similarity, according to an embodiment of the present technology. In a first phase, sensor data 704 collected by a vehicle 702 (e.g., the vehicle 940 of FIG. 9) for a road segment can be used to determine features 706 describing that road segment. In an embodiment, the sensor data 704 can be processed on-board the vehicle 702 for scenario classification or feature identification, or both. In an embodiment, the sensor data 704 can be processed on-board the vehicle 702 and the processed sensor data 704 can be sent to an off-board computing system (e.g., the transportation management system 960 of FIG. 9) for scenario classification or feature identification, or both. In an embodiment, the vehicle 702 can process the sensor data 704 on-board only for scenario classification while the off-board computing system determines feature identification. In an embodiment, the vehicle 702 can process the sensor data 704 on-board only for feature identification while the off-board computing system determines scenario classification. In an embodiment, both raw sensor data and processed sensor data can be used for purposes of scenario classification and feature identification. In an embodiment, the sensor data 704 can be provided to the off-board computing system for scenario classification or feature identification, or both. These features 706 can include myriad features (e.g., road features, contextual features, etc.) as described above. In some embodiments, the features 706 can be logged in a scenario information database 708. In this regard, the features 706 can be associated with their corresponding road segment, and the features 706, their corresponding road segment, and their association can be maintained in the scenario information database 708. Other information can also be logged. For example, in some embodiments, the sensor data 704 and its association with the corresponding road segment can be logged in the scenario information database 708. In some embodiments, any scenario classification and identification information determined for the road segment based on the sensor data 704 can also be logged in the scenario information database 708. In various embodiments, the scenario information database 708 can store information describing associations between classified road segments and corresponding road feature data, scenarios data, contextual features data, and risk profiles, to name some examples. In various embodiments, the scenario information database 708 can continually be updated as new information is logged for road segments. For example, the scenario information database 708 may store information for a given road segment including, for example, sensor data collected by a first vehicle, features determined from the sensor data, and scenarios determined for the road segment based on such information. In this example, the scenario information database 708 can be updated to include additional information for the road segment as subsequently captured by one or more different vehicles. For example, the scenario information database 708 can be updated to include different sensor data captured by a second vehicle while driving the road segment, different features determined from the sensor data, and different scenarios determined for the road segment based on this different information. In some embodiments, sensor data and other related information (e.g., features, scenarios) as captured and determined by different vehicles can be aggregated, for example, to more accurately determine scenario exposure and risk for a given road segment.

In a second phase, information stored in the scenario information database 708 can be used to determine road segment similarity in real time or near real time. For example, features 716 can be determined for an unclassified road segment 712, for example, based on its corresponding sensor data 714. In an embodiment, the sensor data 714 can optionally be acquired by a vehicle traveling along the unclassified road segment. In another embodiment, the sensor data 714 may be obtained from another source (e.g., another vehicle, a remote database, etc.). These features 716 can be used to determine one or more similar road segments 718 that satisfy a threshold similarity to the unclassified road segment 712. In some embodiments, at block 718, the similar road segments can be identified based on information that is stored and accessible from the scenario information database 708. For example, in some embodiments, the features 716 for the unclassified road segment can be represented as a vector. Similarly, features stored in the scenario information database 708 for other road segments can also be represented as respective vectors. In such embodiments, the unclassified road segment and a classified road segment can be determined to be similar based on satisfaction of a threshold level of similarity (e.g., cosine similarity) between their vector representations. In some embodiments, once a similarity between the unclassified road segment and a classified road segment is determined, information associated with the classified road segment can be mapped to the unclassified road segment at block 720. For example, a risk profile, which can be based on scenario exposure rates for the classified road segment, can be associated with the unclassified road segment. As stated, one or more of the steps, processing, functionalities, or modules of the present technology can be performed or implemented in the vehicle 940 or in the transportation management system 960, or both.

Figure 7B:
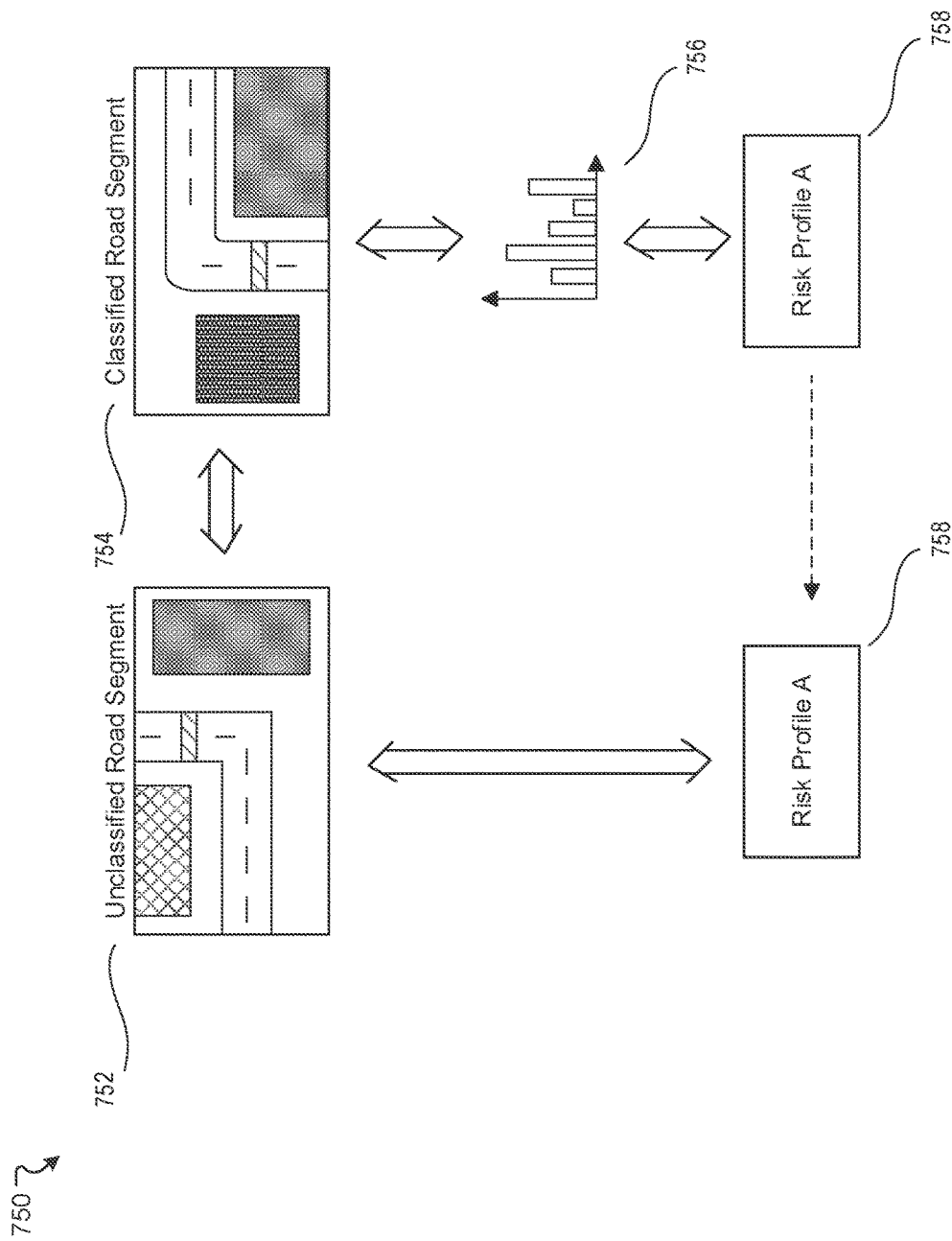
FIG. 7B illustrates an example similarity determination, according to an embodiment of the present technology.

FIG. 7B illustrates an example similarity determination 750, according to an embodiment of the present technology. In FIG. 7B, a determination is made that an unclassified road segment 752 has a threshold level of similarity to a classified road segment 754. In some embodiments, this similarity determination can be made based on a comparison of features (e.g., road features, contextual features, map data, visual data, etc.) associated with the unclassified road segment 752 and the classified road segment 754. In some embodiments, once a threshold level of similarity is determined, information associated with the classified road segment 754 can also be associated with the unclassified road segment 752. In the example of FIG. 7B, a risk profile 758 for the classified road segment 754 can be associated with the unclassified road segment 752. In some embodiments, the risk profile 758 can be based on scenario exposure rates 756 for the classified road segment 754. In an embodiment, the scenario exposure rates 756 can describe relevant scenarios encountered on the road segment 754, their characterization, and their frequency. Many variations are possible.

Figure 8A:
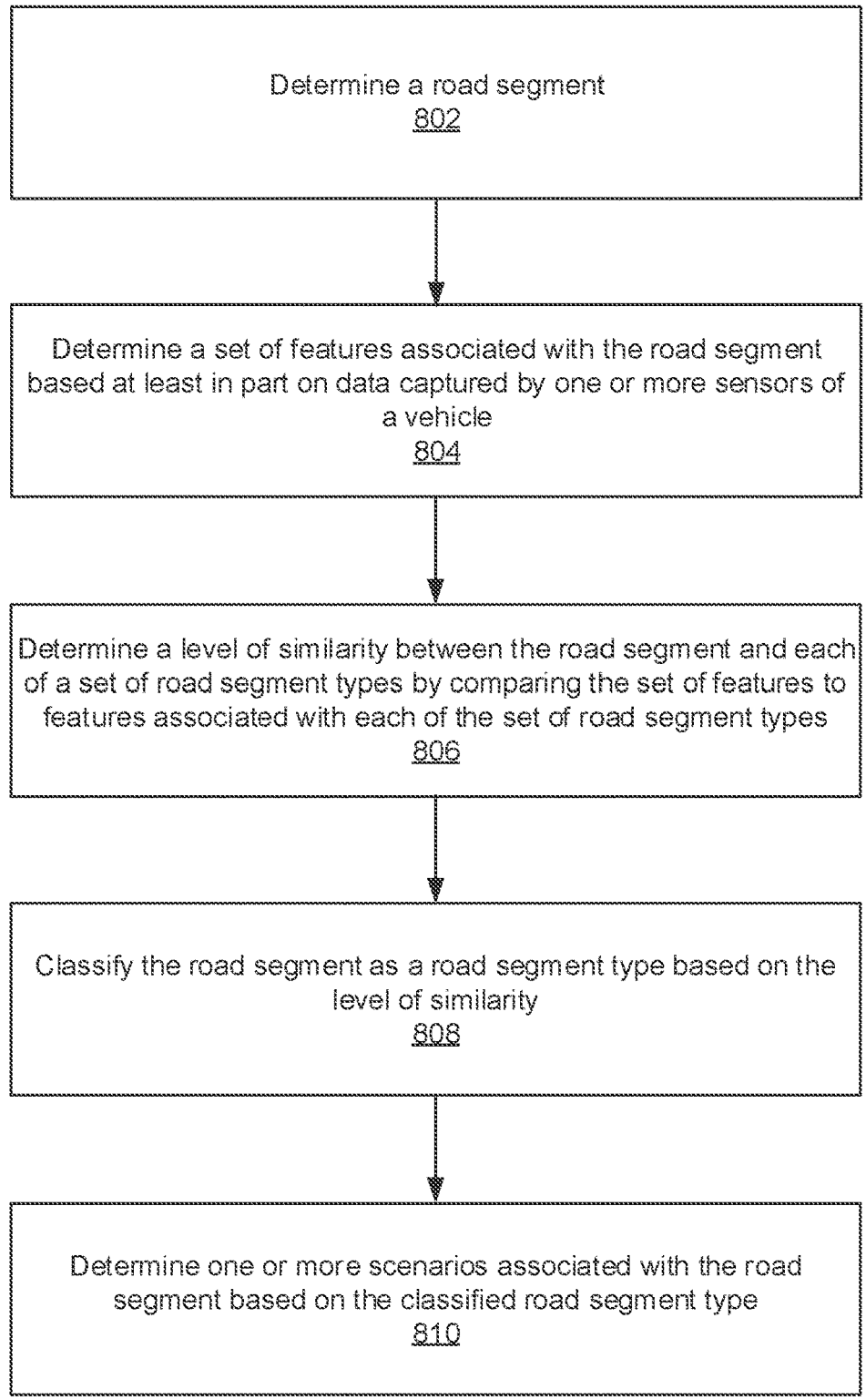
FIG. 8A illustrates an example method, according to an embodiment of the present technology.

FIG. 8A illustrates an example method 800, according to an embodiment of the present technology. At block 802, a road segment can be determined. At block 804, a set of features associated with the road segment can be determined based at least in part on data captured by one or more sensors of a vehicle. At block 806, a level of similarity between the road segment and each of a set of road segment types can be determined by comparing the set of features to features associated with each of the set of road segment types. At block 808, the road segment can be classified as the road segment type based on the level of similarity. At block 810, scenario information associated with the road segment can be determined based on the classified road segment type. Many variations to the example method are possible. It should be appreciated that there can be additional, fewer, or alternative steps performed in similar or alternative orders, or in parallel, within the scope of the various embodiments discussed herein unless otherwise stated.

Figure 8B:
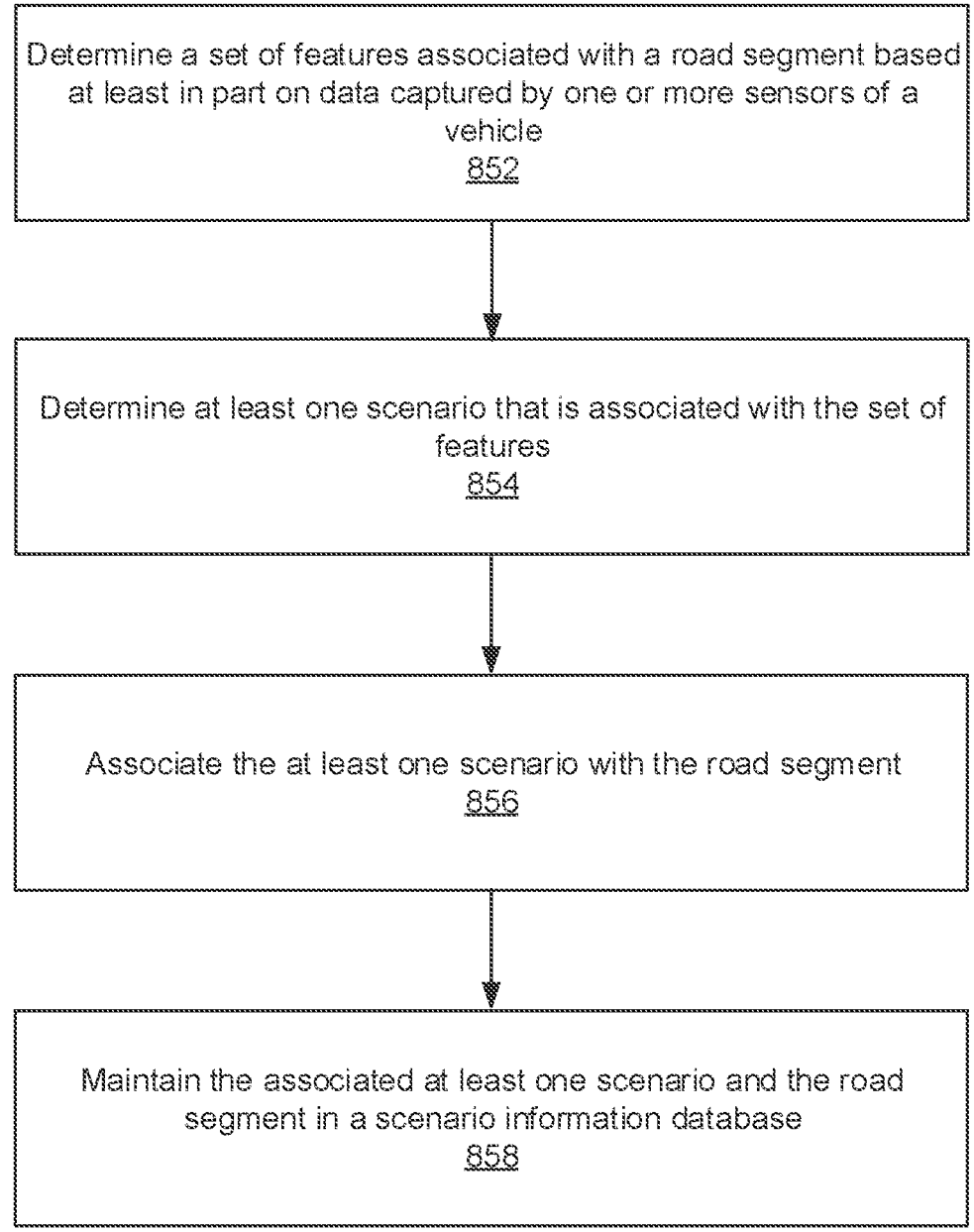
FIG. 8B illustrates another example method, according to an embodiment of the present technology.

FIG. 8B illustrates an example method 850, according to an embodiment of the present technology. At block 852, a set of features associated with a road segment is determined based at least in part on data captured by one or more sensors of a vehicle. At block 854, at least one scenario that is associated with the set of features is determined. At block 856, the at least one scenario is associated with the road segment. At block 858, the associated at least one scenario and road segment are maintained in a scenario information database. Many variations to the example method are possible. It should be appreciated that there can be additional, fewer, or alternative steps performed in similar or alternative orders, or in parallel, within the scope of the various embodiments discussed herein unless otherwise stated.

FIG. 9 illustrates an example block diagram of a transportation management environment for matching ride requestors with vehicles. In particular embodiments, the environment may include various computing entities, such as a user computing device 930 of a user 901 (e.g., a ride provider or requestor), a transportation management system 960, a vehicle 940, and one or more third-party systems 970. The vehicle 940 can be autonomous, semi-autonomous, or manually drivable. The computing entities may be communicatively connected over any suitable network 910. As an example and not by way of limitation, one or more portions of network 910 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 9 illustrates a single user device 930, a single transportation management system 960, a single vehicle 940, a plurality of third-party systems 970, and a single network 910, this disclosure contemplates any suitable number of each of these entities. As an example and not by way of limitation, the network environment may include multiple users 901, user devices 930, transportation management systems 960, vehicles 940, third-party systems 970, and networks 910. In some embodiments, some or all modules of the road segment classification module 202 may be implemented by one or more computing systems of the transportation management system 960. In some embodiments, some or all modules of the road segment classification module 202 may be implemented by one or more computing systems in the vehicle 940.

The user device 930, transportation management system 960, vehicle 940, and third-party system 970 may be communicatively connected or co-located with each other in whole or in part. These computing entities may communicate via different transmission technologies and network types. For example, the user device 930 and the vehicle 940 may communicate with each other via a cable or short-range wireless communication (e.g., Bluetooth, NFC, WI-FI, etc.), and together they may be connected to the Internet via a cellular network that is accessible to either one of the devices (e.g., the user device 930 may be a smartphone with LTE connection). The transportation management system 960 and third-party system 970, on the other hand, may be connected to the Internet via their respective LAN/WLAN networks and Internet Service Providers (ISP). FIG. 9 illustrates transmission links 950 that connect user device 930, vehicle 940, transportation management system 960, and third-party system 970 to communication network 910. This disclosure contemplates any suitable transmission links 950, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 950 may connect to one or more networks 910, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 950. For example, the user device 930 may communicate with the transportation management system via a cellular network and the Internet, but communicate with the vehicle 940 via Bluetooth or a physical wire connection.

In particular embodiments, the transportation management system 960 may fulfill ride requests for one or more users 901 by dispatching suitable vehicles. The transportation management system 960 may receive any number of ride requests from any number of ride requestors 901. In particular embodiments, a ride request from a ride requestor 901 may include an identifier that identifies the ride requestor in the system 960. The transportation management system 960 may use the identifier to access and store the ride requestor's 901 information, in accordance with the requestor's 901 privacy settings. The ride requestor's 901 information may be stored in one or more data stores (e.g., a relational database system) associated with and accessible to the transportation management system 960. In particular embodiments, ride requestor information may include profile information about a particular ride requestor 901. In particular embodiments, the ride requestor 901 may be associated with one or more categories or types, through which the ride requestor 901 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 960 may classify a user 901 based on known information about the user 901 (e.g., using machine-learning classifiers), and use the classification to retrieve relevant aggregate information associated with that class. For example, the system 960 may classify a user 901 as a young adult and retrieve relevant aggregate information associated with young adults, such as the type of music generally preferred by young adults.

Transportation management system 960 may also store and access ride information. Ride information may include locations related to the ride, traffic data, route options, optimal pick-up or drop-off locations for the ride, or any other suitable information associated with a ride. As an example and not by way of limitation, when the transportation management system 960 receives a request to travel from San Francisco International Airport (SFO) to Palo Alto, California, the system 960 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 960. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 960. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 960 in particular embodiments may predict and provide ride suggestions in response to a ride request. In particular embodiments, the system 960 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 960 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 960 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 930 (which may belong to a ride requestor or provider), a transportation management system 960, vehicle system 940, or a third-party system 970 to process, transform, manage, retrieve, modify, add, or delete the information stored in the data store.

In particular embodiments, transportation management system 960 may include an authorization server (or any other suitable component(s)) that allows users 901 to opt-in to or opt-out of having their information and actions logged, recorded, or sensed by transportation management system 960 or shared with other systems (e.g., third-party systems 970). In particular embodiments, a user 901 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 901 of transportation management system 960 through blocking, data hashing, anonymization, or other suitable techniques as appropriate.

In particular embodiments, third-party system 970 may be a network-addressable computing system that may provide HD maps or host GPS maps, customer reviews, music or content, weather information, or any other suitable type of information. Third-party system 970 may generate, store, receive, and send relevant data, such as, for example, map data, customer review data from a customer review website, weather data, or any other suitable type of data. Third-party system 970 may be accessed by the other computing entities of the network environment either directly or via network 910. For example, user device 930 may access the third-party system 970 via network 910, or via transportation management system 960. In the latter case, if credentials are required to access the third-party system 970, the user 901 may provide such information to the transportation management system 960, which may serve as a proxy for accessing content from the third-party system 970.

In particular embodiments, user device 930 may be a mobile computing device such as a smartphone, tablet computer, or laptop computer. User device 930 may include one or more processors (e.g., CPU, GPU), memory, and storage. An operating system and applications may be installed on the user device 930, such as, e.g., a transportation application associated with the transportation management system 960, applications associated with third-party systems 970, and applications associated with the operating system. User device 930 may include functionality for determining its location, direction, or orientation, based on integrated sensors such as GPS, compass, gyroscope, or accelerometer. User device 930 may also include wireless transceivers for wireless communication and may support wireless communication protocols such as Bluetooth, near-field communication (NFC), infrared (IR) communication, WI-FI, and 2G/3G/4G/LTE mobile communication standard. User device 930 may also include one or more cameras, scanners, touchscreens, microphones, speakers, and any other suitable input-output devices.

In particular embodiments, the vehicle 940 may be equipped with an array of sensors 944, a navigation system 946, and a ride-service computing device 948. In particular embodiments, a fleet of vehicles 940 may be managed by the transportation management system 960. The fleet of vehicles 940, in whole or in part, may be owned by the entity associated with the transportation management system 960, or they may be owned by a third-party entity relative to the transportation management system 960. In either case, the transportation management system 960 may control the operations of the vehicles 940, including, e.g., dispatching select vehicles 940 to fulfill ride requests, instructing the vehicles 940 to perform select operations (e.g., head to a service center or charging/fueling station, pull over, stop immediately, self-diagnose, lock/unlock compartments, change music station, change temperature, and any other suitable operations), and instructing the vehicles 940 to enter select operation modes (e.g., operate normally, drive at a reduced speed, drive under the command of human operators, and any other suitable operational modes).

In particular embodiments, the vehicles 940 may receive data from and transmit data to the transportation management system 960 and the third-party system 970. Examples of received data may include, e.g., instructions, new software or software updates, maps, 3D models, trained or untrained machine-learning models, location information (e.g., location of the ride requestor, the vehicle 940 itself, other vehicles 940, and target destinations such as service centers), navigation information, traffic information, weather information, entertainment content (e.g., music, video, and news) ride requestor information, ride information, and any other suitable information. Examples of data transmitted from the vehicle 940 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 940, passengers may send/receive data to the transportation management system 960 and third-party system 970), and any other suitable data.

In particular embodiments, vehicles 940 may also communicate with each other, including those managed and not managed by the transportation management system 960. For example, one vehicle 940 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 960 or third-party system 970), or both.

In particular embodiments, a vehicle 940 may obtain and process sensor/telemetry data. Such data may be captured by any suitable sensors. For example, the vehicle 940 may have a Light Detection and Ranging (LiDAR) sensor array of multiple LiDAR transceivers that are configured to rotate 360°, emitting pulsed laser light and measuring the reflected light from objects surrounding vehicle 940. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 940. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 940 may have optical cameras pointing in different directions. The cameras may be used for, e.g., recognizing roads, lane markings, street signs, traffic lights, police, other vehicles, and any other visible objects of interest. To enable the vehicle 940 to "see" at night, infrared cameras may be installed. In particular embodiments, the vehicle may be equipped with stereo vision for, e.g., spotting hazards such as pedestrians or tree branches on the road. As another example, the vehicle 940 may have radars for, e.g., detecting other vehicles and hazards afar. Furthermore, the vehicle 940 may have ultrasound equipment for, e.g., parking and obstacle detection. In addition to sensors enabling the vehicle 940 to detect, measure, and understand the external world around it, the vehicle 940 may further be equipped with sensors for detecting and self-diagnosing the vehicle's own state and condition. For example, the vehicle 940 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 940 may build a 3D model of its surrounding based on data from its LiDAR, radar, sonar, and cameras, along with a pre-generated map obtained from the transportation management system 960 or the third-party system 970. Although sensors 944 appear in a particular location on the vehicle 940 in FIG. 9, sensors 944 may be located in any suitable location in or on the vehicle 940. Example locations for sensors include the front and rear bumpers, the doors, the front windshield, on the side panel, or any other suitable location.

In particular embodiments, the vehicle 940 may be equipped with a processing unit (e.g., one or more CPUs and GPUs), memory, and storage. The vehicle 940 may thus be equipped to perform a variety of computational and processing tasks, including processing the sensor data, extracting useful information, and operating accordingly. For example, based on images captured by its cameras and a machine-vision model, the vehicle 940 may identify particular types of objects captured by the images, such as pedestrians, other vehicles, lanes, curbs, and any other objects of interest.

In particular embodiments, the vehicle 940 may have a navigation system 946 responsible for safely navigating the vehicle 940. In particular embodiments, the navigation system 946 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 946 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 946 may use its determinations to control the vehicle 940 to operate in prescribed manners and to guide the vehicle 940 to its destinations without colliding into other objects. Although the physical embodiment of the navigation system 946 (e.g., the processing unit) appears in a particular location on the vehicle 940 in FIG. 9, navigation system 946 may be located in any suitable location in or on the vehicle 940. Example locations for navigation system 946 include inside the cabin or passenger compartment of the vehicle 940, near the engine/battery, near the front seats, rear seats, or in any other suitable location.

In particular embodiments, the vehicle 940 may be equipped with a ride-service computing device 948, which may be a tablet or any other suitable device installed by transportation management system 960 to allow the user to interact with the vehicle 940, transportation management system 960, other users 901, or third-party systems 970. In particular embodiments, installation of ride-service computing device 948 may be accomplished by placing the ride-service computing device 948 inside the vehicle 940, and configuring it to communicate with the vehicle 940 via a wired or wireless connection (e.g., via Bluetooth). Although FIG. 9 illustrates a single ride-service computing device 948 at a particular location in the vehicle 940, the vehicle 940 may include several ride-service computing devices 948 in several different locations within the vehicle. As an example and not by way of limitation, the vehicle 940 may include four ride-service computing devices 948 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 948 may be detachable from any component of the vehicle 940. This may allow users to handle ride-service computing device 948 in a manner consistent with other tablet computing devices. As an example and not by way of limitation, a user may move ride-service computing device 948 to any location in the cabin or passenger compartment of the vehicle 940, may hold ride-service computing device 948, or handle ride-service computing device 948 in any other suitable manner. Although this disclosure describes providing a particular computing device in a particular manner, this disclosure contemplates providing any suitable computing device in any suitable manner.

Figure 10:
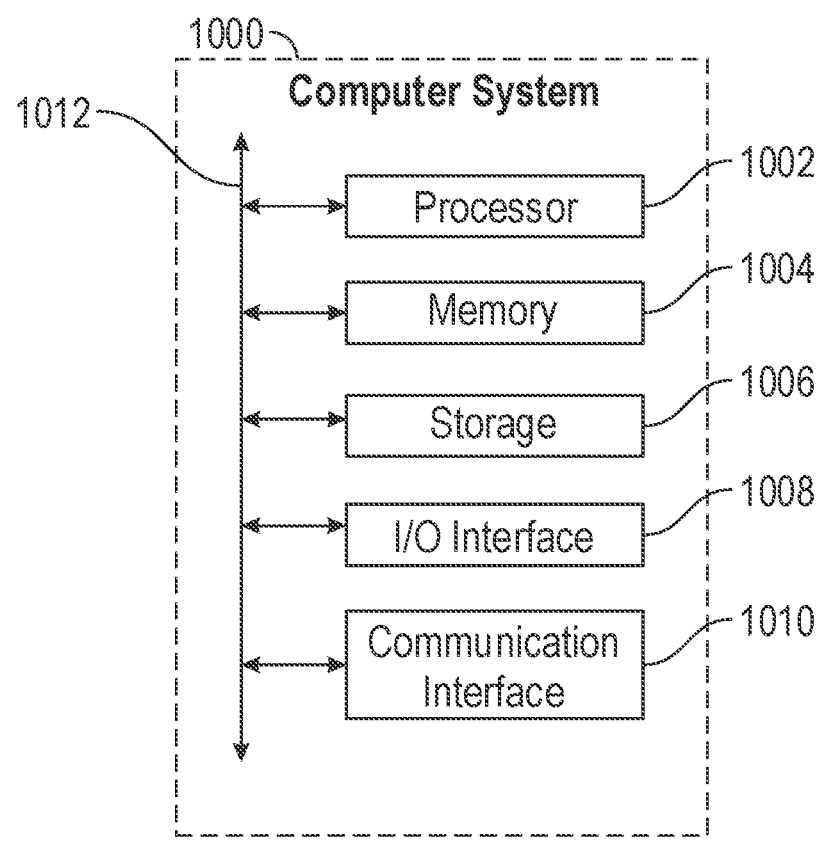
FIG. 10 illustrates an example of a computer system or computing device that can be utilized in various scenarios, according to an embodiment of the present technology.

FIG. 10 illustrates an example computer system 1000. In particular embodiments, one or more computer systems 1000 perform one or more steps of one or more methods described or illustrated herein. In particular embodiments, one or more computer systems 1000 provide the functionalities described or illustrated herein. In particular embodiments, software running on one or more computer systems 1000 performs one or more steps of one or more methods described or illustrated herein or provides the functionalities described or illustrated herein. Particular embodiments include one or more portions of one or more computer systems 1000. Herein, a reference to a computer system may encompass a computing device, and vice versa, where appropriate. Moreover, a reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 that are to be operated on by computer instructions; the results of previous instructions executed by processor 1002 that are accessible to subsequent instructions or for writing to memory 1004 or storage 1006; or any other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs), be a multi-core processor, or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described in further detail below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware or software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware or software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware or software, or both coupling components of computer system 1000 to each other. As an example and not by way of limitation, bus 1012 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
 determining, by a computing system, one or more scenarios associated with a road segment based on sensor data captured by one or more vehicles;
 determining, by the computing system, a threshold similarity between the road segment and a road segment type based on the one or more scenarios associated with the road segment matching a threshold number of scenarios included in a scenario type associated with the road segment type, wherein the matching is determined based on a multi-level scenarios taxonomy that classifies a plurality of scenario types with respective scenarios, wherein a first level of the multi-level scenarios taxonomy includes a set of the scenarios included in the scenario type and a second level of the multi-level scenarios taxonomy includes a subset of the set of the scenarios;

classifying, by the computing system, the road segment as the road segment type based on the threshold similarity;

providing, by the computing system, information describing the classified road segment and the scenario type to a computing device of a vehicle; and causing, by the computing system, control of an operation of the vehicle based on the information.

2. The computer-implemented method of claim 1, wherein the first level of the multi-level scenarios taxonomy provides a higher level of generality than the second level of the multi-level scenarios taxonomy.

3. The computer-implemented method of claim 1, wherein determining the one or more scenarios associated with the road segment based on sensor data captured by the one or more vehicles comprises:

determining, by the computing system, a set of features associated with the road segment based at least in part on the sensor data; and determining, by the computing system, the one or more scenarios based on a comparison of the set of features associated with the road segment and respective features associated with the one or more scenarios.

4. The computer-implemented method of claim 1, further comprising:

determining, by the computing system, a risk profile associated with the classified road segment based on the threshold similarity between the classified road segment and the road segment type, wherein the risk profile provides respective exposure rates for the scenarios included in the scenario type associated with the road segment type.

5. The computer-implemented method of claim 1, wherein the information is provided to the computing device of the vehicle to navigate the classified road segment.

6. The computer-implemented method of claim 5, wherein, when the vehicle is associated with the classified road segment, the computing device associated with the vehicle is configured to generate vehicle operation instructions based on the provided information to navigate the classified road segment.

7. The computer-implemented method of claim 1, further comprising:

logging, by the computing system, an association between the classified road segment, the road segment type, and the scenario type in a scenario information database.

8. The computer-implemented method of claim 1, further comprising:

determining, by the computing system, a geographic region that includes the classified road segment;

determining, by the computing system, a plurality of road segment types associated with the geographic region, the plurality of road segment types including the road segment type; and determining, by the computing system, a threshold similarity between the geographic region and a different geographic region based on a comparison of the plurality of road segment types associated with the geographic region and a plurality of road segment types associated with the different geographic region.

9. The computer-implemented method of claim 8, further comprising:

determining, by the computing system, scenario information associated with the geographic region based on the threshold similarity between the geographic region and the different geographic region.

10. The computer-implemented method of claim 8, further comprising:

determining, by the computing system, a collective risk profile associated with the geographic region based on the threshold similarity between the geographic region and the different geographic region, wherein the collective risk profile provides respective exposure rates for scenarios associated with the different geographic region.

11. A system comprising:

at least one processor; and a memory storing instructions that, when executed by the at least one processor, cause the system to perform:

determining one or more scenarios associated with a road segment based on sensor data captured by one or more vehicles;

determining a threshold similarity between the road segment and a road segment type based on the one or more scenarios associated with the road segment matching a threshold number of scenarios included in a scenario type associated with the road segment type, wherein the matching is determined based on a multi-level scenarios taxonomy that classifies a plurality of scenario types with respective scenarios, wherein a first level of the multi-level scenarios taxonomy includes a set of the scenarios included in the scenario type and a second level of the multi-level scenarios taxonomy includes a subset of the set of the scenarios;

classifying the road segment as the road segment type based on the threshold similarity;

providing information describing the classified road segment and the scenario type to a computing device of a vehicle; and causing control of an operation of the vehicle based on the information.

12. The system of claim 11, wherein the first level of the multi-level scenarios taxonomy provides a higher level of generality than the second level of the multi-level scenarios taxonomy.

13. The system of claim 11, wherein determining the one or more scenarios associated with the road segment based on sensor data captured by the one or more vehicles causes the system to perform:

determining, by the computing system, a set of features associated with the road segment based at least in part on the sensor data; and determining, by the computing system, the one or more scenarios based on a comparison of the set of features associated with the road segment and respective features associated with the one or more scenarios.

14. The system of claim 11, wherein the instructions further cause the system to perform:

determining, by the computing system, a risk profile associated with the classified road segment based on the threshold similarity between the classified road segment and the road segment type, wherein the risk profile provides respective exposure rates for the scenarios included in the scenario type associated with the road segment type.

15. The system of claim 11, wherein the information is provided to the computing device of the vehicle to navigate the classified road segment.

16. A non-transitory computer-readable storage medium including instructions that, when executed by at least one processor of a computing system, cause the computing system to perform a method comprising:
- determining one or more scenarios associated with a road segment based on sensor data captured by one or more vehicles;
- determining a threshold similarity between the road segment and a road segment type based on the one or more scenarios associated with the road segment matching a threshold number of scenarios included in a scenario type associated with the road segment type, wherein the matching is determined based on a multi-level scenarios taxonomy that classifies a plurality of scenario types with respective scenarios, wherein a first level of the multi-level scenarios taxonomy includes a set of the scenarios included in the scenario type and a second level of the multi-level scenarios taxonomy includes a subset of the set of the scenarios;
- classifying the road segment as the road segment type based on the threshold similarity;
- providing information describing the classified road segment and the scenario type to a computing device of a vehicle; and
- causing control of an operation of the vehicle based on the information.

17. The non-transitory computer-readable storage medium of claim 16, wherein the first level of the multi-level scenarios taxonomy provides a higher level of generality than the second level of the multi-level scenarios taxonomy.

18. The non-transitory computer-readable storage medium of claim 16, wherein determining the one or more scenarios associated with the road segment based on sensor data captured by the one or more vehicles causes the system to perform:
- determining, by the computing system, a set of features associated with the road segment based at least in part on the sensor data; and
- determining, by the computing system, the one or more scenarios based on a comparison of the set of features associated with the road segment and respective features associated with the one or more scenarios.

19. The non-transitory computer-readable storage medium of claim 16, wherein the instructions further cause the system to perform:
- determining, by the computing system, a risk profile associated with the classified road segment based on the threshold similarity between the classified road segment and the road segment type, wherein the risk profile provides respective exposure rates for the scenarios included in the scenario type associated with the road segment type.

20. The non-transitory computer-readable storage medium of claim 16, wherein the information is provided to the computing device of the vehicle to navigate the classified road segment.

* * * * *